(12) United States Patent
Kondo

(10) Patent No.: US 6,370,546 B1
(45) Date of Patent: *Apr. 9, 2002

(54) FIRST INFORMATION PROCESSING DEVICE DIRECTLY ACCESSING, UPDATING SECOND INFORMATION PROCESS DEVICE AND VICE VERSA VIA TRANSMISSION BUS MANAGEMENT AUTHORITY

(75) Inventor: Tetsujiro Kondo, Kanagawa (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/829,407

(22) Filed: Mar. 31, 1997

(30) Foreign Application Priority Data

Apr. 8, 1996 (JP) ............................................. 8-084931
Apr. 8, 1996 (JP) ............................................. 8-084955

(51) Int. Cl.⁷ .............................................. G06F 17/30
(52) U.S. Cl. .............................. 707/201; 707/8; 707/10
(58) Field of Search ........................... 707/200–205, 707/1–2, 8–10; 711/111–132, 147, 148; 395/284, 281, 283, 800.01; 710/101, 102, 129

(56) References Cited

U.S. PATENT DOCUMENTS 5,598,537 A * 1/1997 Swanstrom et al. ........ 710/101
5,598,539 A * 1/1997 Gephardt et al. ........... 395/281
5,606,712 A * 2/1997 Hidaka .................. 395/800.01
5,625,829 A * 4/1997 Gephardt et al. ........... 395/284
5,632,020 A * 5/1997 Gephardt et al. ........... 395/283
5,666,530 A * 9/1997 Clark et al. ................. 707/201
5,710,922 A * 1/1998 Alley et al. ................. 707/201

* cited by examiner

*Primary Examiner*—Jack Choules
*Assistant Examiner*—Srirama Channavajjala
(74) *Attorney, Agent, or Firm*—Bell, Boyd & Lloyd LLC

(57) ABSTRACT

An information processing system comprises a first information processing device and a second information processing device connected to the first information processing device. Here, the first information processing device comprises a first connection device connected to the first information processing device, a first memory for storing information and a first processor for processing information. The second information processing device comprises a second connection device connected to the first connection device, a second memory for storing information and a second processor for processing information. The first processor directly accesses the second memory of the second information processing device to read and write information and the second processor directly accesses the first memory of the first information processing device to read and write information. The above is configured so as to be capable of managing information files in common and improving operativity while simplifying management of information files and maintaining secrecy.

18 Claims, 28 Drawing Sheets

FIRST INFORMATION PROCESSING DEVICE DIRECTLY ACCESSING, UPDATING SECOND INFORMATION PROCESS DEVICE AND VICE VERSA VIA TRANSMISSION BUS MANAGEMENT AUTHORITY

BACKGROUND OF THE INVENTION

1. Field of the Invention

The present invention relates to an information processing system and information processing device, and more particularly to an information processing system and information processing devicecapable of managing information files in common and improving operativity or capable of easily managing information files and maintaining secrecy.

2. Related Art

In recent years, information processing devices referred to as personal computers and portable information terminals have rapidly become more widespread. Various information can be sent and received using these personal computers and portable information terminals via international networks such as the Internet or ISDN (Integrated Service Digital Network). These personal computers and portable information terminals take on various forms such as desk-top, laptop, notebook or portable personal computers or portable information terminals etc. having electronic mail functions, but currently, desktop personal computers are prevalent.

As these desktop personal computers have become widespread, people involved in business have tended to have a portable information terminal that is separate from the desktop computer terminal. The user will then access the desktop personal computer from the portable information terminal as necessary to send and receive information.

However, these personal computers and portable information terminals basically carry out processing independently from each other. The various files are therefore managed within the personal computer and within the portable information terminal, respectively. When information files managed by one personal computer or portable information terminal are to be processed at another personal computer or portable information terminal, the information files stored on the one personal computer or portable information terminal are temporarily stored on a memory card or floppy disc. This memory card or floppy disc is then installed in the other personal computer or portable information terminal and the information files can then be read by the other personal computer or portable information terminal.

As a result, the information files are temporarily stored on the personal computers or portable information terminals of both sides. Then, as times passes from the time of processing, it becomes difficult to determine which of the information files are the newest and operativity is therefore poor.

Further, the sending and receiving of data can be easily carried out to other information processing devices via a network. The likelihood of a third party accessing this information without permission and reading secret information is therefore high.

As the present invention sets out to resolve the above problems, it is therefore the object of the present invention to be capable of managing information files in common and improving operativity.

It is a further object of the present invention to simplify management of information files and maintain secrecy.

SUMMARY OF THE INVENTION

In order to achieve the aforementioned objects, according to the present invention, an information processing system comprises a first information processing device and a second information processing device connected to the first information processing device. Here, the first information processing device comprises a first connection device connected to the first information processing device, a first memory for storing information and a first processor for processing information. The second information processing device comprises a second connection device connected to the first connection device, a second memory for storing information and a second processor for processing information. The first processor directly accesses the second memory of the second information processing device to read and write information and the second processor directly accesses the first memory of the first information processing device to read and write information.

Further, the first processor lists the second memory of the second information processing device as a management device of the first processor when the first connection device and the second connection device are connected and the second processor lists the first memory of the first information processing device as a management device of the second processor.

The second information processing device can be a portable information processing device.

Moreover, according to the present invention, in a portable information processing device connected to a prescribed information processing device, the prescribed information processing device comprises a first memory, a first processor and a first connection device. The portable information processing device comprises a second connection device connected to the first connection device of the prescribed information processing device, a second memory for storing information and a second processor for processing information. The second processor directly accesses the first memory of the prescribed information processing device to read and write information.

The second memory can be permitted to directly access the first processor to read and write information.

The second processor can list the first memory of the information processing device as a management device of the second processor when the first connection device and the second connection device are connected.

Further, according to the present invention, in an information processing device connected to a portable information processing device the portable information processing device comprises a memory, processor, and connection device. The information processing device comprises a connection device connected to the connection device of the portable information processing device, a memory for storing information and a processor for processing information. The processor of the information processing device is then directly connecting to the memory of the portable information processing device to read and write information.

The memory of the information processing device can be permitted to directly access the processor of the portable information processing device to write and read information.

The processor of the information processing device can list the memory of the portable information processing device as a management device of the processor of the information processing device when the connection device of the portable information processing device and the connection device of the information processing device are connected.

Still further, according to the present invention, an information processing system comprises a main information processing device and a sub-information processing device connected to the main information processing device. Here, the main information processing device comprises a connection device connected to the sub-information processing device, a memory for storing information and a main processor for processing information. The sub-information processing device comprises a connection device connected to the connection device of the sub-information processing device, a memory for storing information and a sub-processor for processing information. The main processor directly accesses the memory of the sub-information processing device to read and write information. The memory of the main information processing device is directly accessed by the processor in such a manner as to prohibit reading and writing of information.

The main processor can list the memory of the sub-processing device as a management device of the main processor when the connection device of the information processing device and the connection device of the sub-information processing device are connected.

The sub-information processing device is a portable information processing device.

The portable information processing device includes a communication device for carrying out communications with a further information processing device connected via a communications system.

Moreover, according to the present invention, a portable information processing device is connected to a main information processing device. Here, the main information processing device comprises a memory, main processor and a connection device. The portable information processing device comprises a connection device connected to the connection device of the main information processing device, a memory for storing information and a sub-processor for processing information. The memory of the sub-information processing device is allowed to be directly accessed by the processor to read and write information.

The memory of the sub-information processing device can be listed as a management device of the processor when the connection device of the main information processing device and the connection device of the sub-information processing device are connected.

The portable information processing device can include a communications device for communicating with a further information processing device connected via a communications system.

Still further, according to the present invention, an information processing device is connected to a portable information processing device. Here, the portable information processing device comprises a memory, a sub-processor and a connection device. The information processing device comprises a connection device connected to the connection device of the portable information processing device, memory for storing information and a main processor for processing information. The main processor directly accesses the memory of the portable information processing device to read and write information. The memory of the main information processing device is directly accessed by the processor in such a manner as to prohibit reading and writing of information.

The main processor of the information processing device can list the memory of the portable information processing device as a management device of the main processor of the information processing device when the connection device of the portable information processing device and the connection device of the information processing device are connected.

DETAILED DESCRIPTION OF THE PREFERRED EMBODIMENTS

First Embodiment

Figure 1:
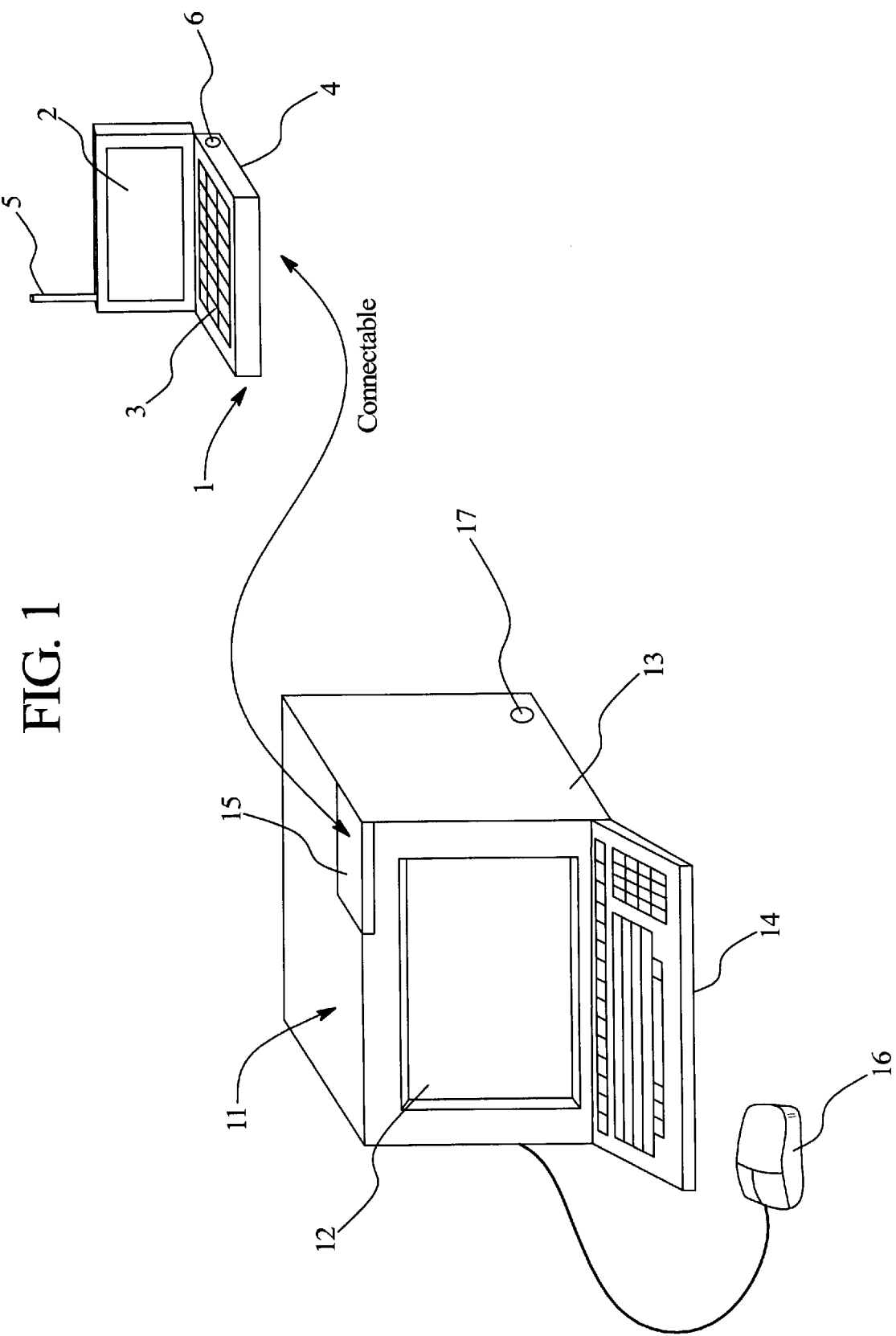
FIG. 1 is a view showing an example configuration of an information processing system of a first embodiment of the present invention.

FIG. 1 shows an example configuration of a first embodiment of an information processing system of the present invention. In the following example of a first embodiment, a description is given of an information processing system employing a portable personal computer and a desktop personal computer, but the present invention can also be applied to other information processing devices.

This information processing system basically comprises a portable personal computer 1 and a desktop personal computer 11. The portable personal computer 1 comprises an LCD 2 for displaying characters and graphics and a keyboard 3 operated when inputting various instructions. Further, a connector 4 is provided on the underside of the portable personal computer 1 in such a manner as to connect directly with a connector 15 formed on the upper side of the desktop personal computer 11.

The desktop personal computer 11 comprises a display 12 for displaying characters and graphics, a main body 13 having circuitry for processing various information built-in, a keyboard 14 and mouse 16 operated at the time of inputting each of the various instructions, and a wire terminal 17 connected to the network.

Figure 2:
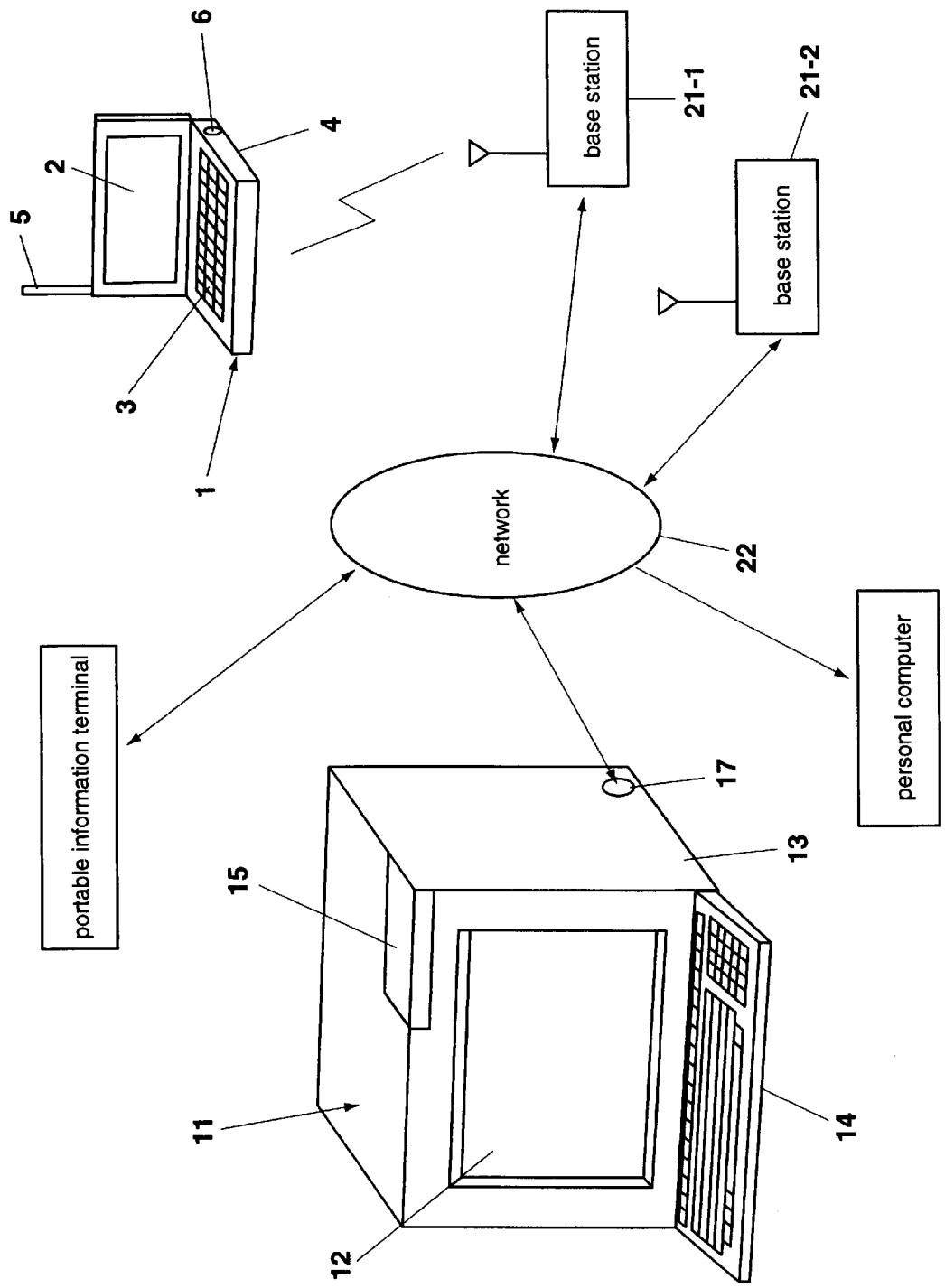
FIG. 2 is a view showing an example of connecting the information processing system of the first embodiment of the present invention to a communications system.

As shown in FIG. 1, the portable personal computer 1 has an antenna for wireless use 5 and a wire terminal 6 so as to be capable of both wireless communication and wired communication. For example, as shown in FIG. 2, by utilizing this wireless communication function, when the user carries the portable personal computer 1 to a certain place, communication can then be carried out using a wireless line with the nearest base station 21-$i$ (i=1, 2, ...).

The base station 21-$i$ can then be connected to the desktop personal computer 11 and to other peoples' personal computers and portable information terminals via a network 22 or further base station 21-$i$ so that data can be transmitted and received between the desktop personal computer 11 and other personal computers and portable information terminals. Further, with the wired communication function, the user can send and receive data between the desktop personal computer 11 and other peoples computers and portable information terminals by connecting the wired terminal 6 and the network 22.

Figure 3:
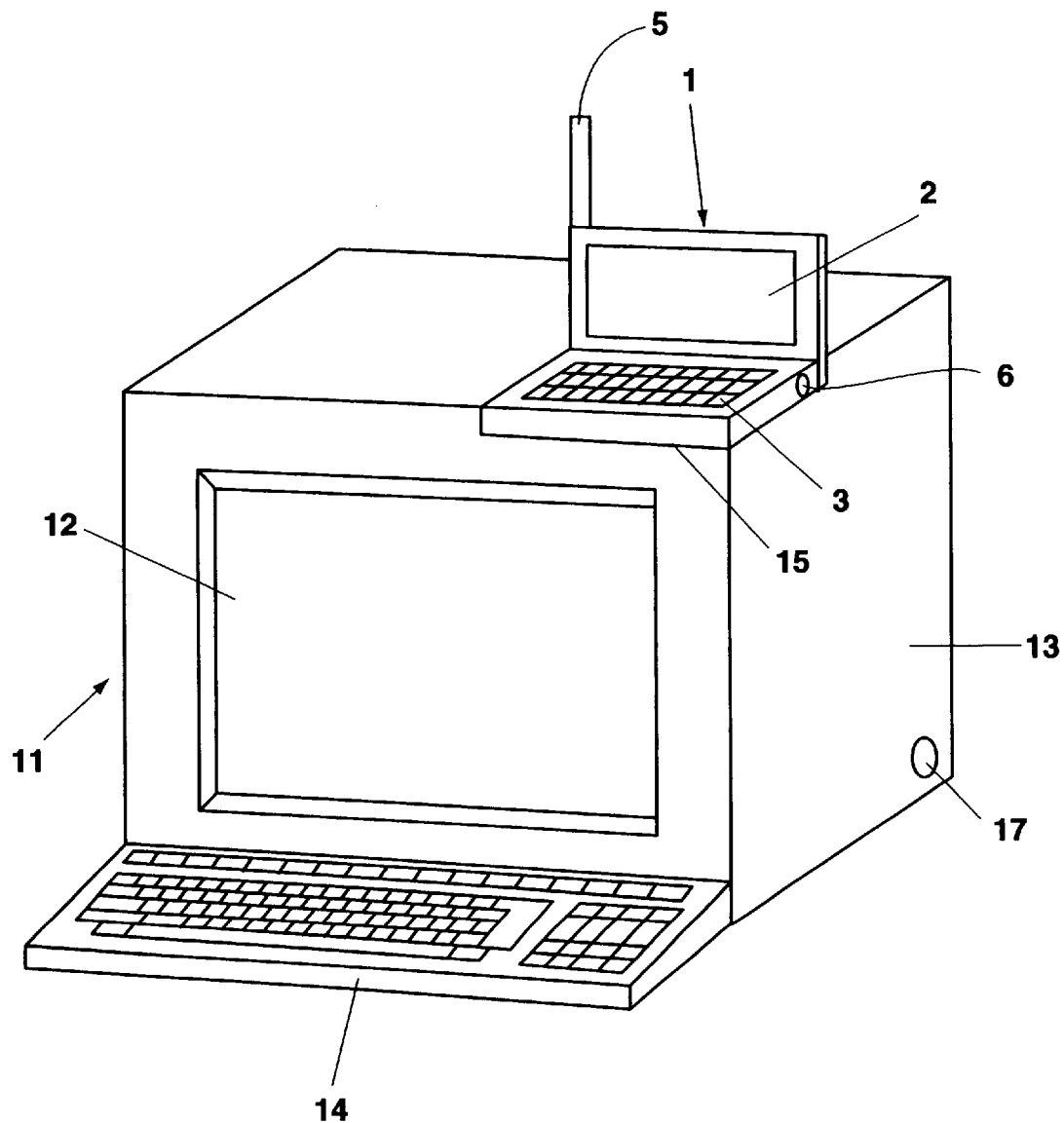
FIG. 3 is an oblique view showing a portable personal computer and a desktop personal computer of the first embodiment of the present invention in a connected state.

Further, in the first embodiment, as well as the portable personal computer 1 and the desktop personal computer 11 being able to carry out each of the various processes independently of each other, as shown in FIG. 3, these items can also be utilized as a single device by directly connecting the connector 4 of the portable personal computer 1 to the connector 15 of the desktop personal computer 11.

Figure 4:
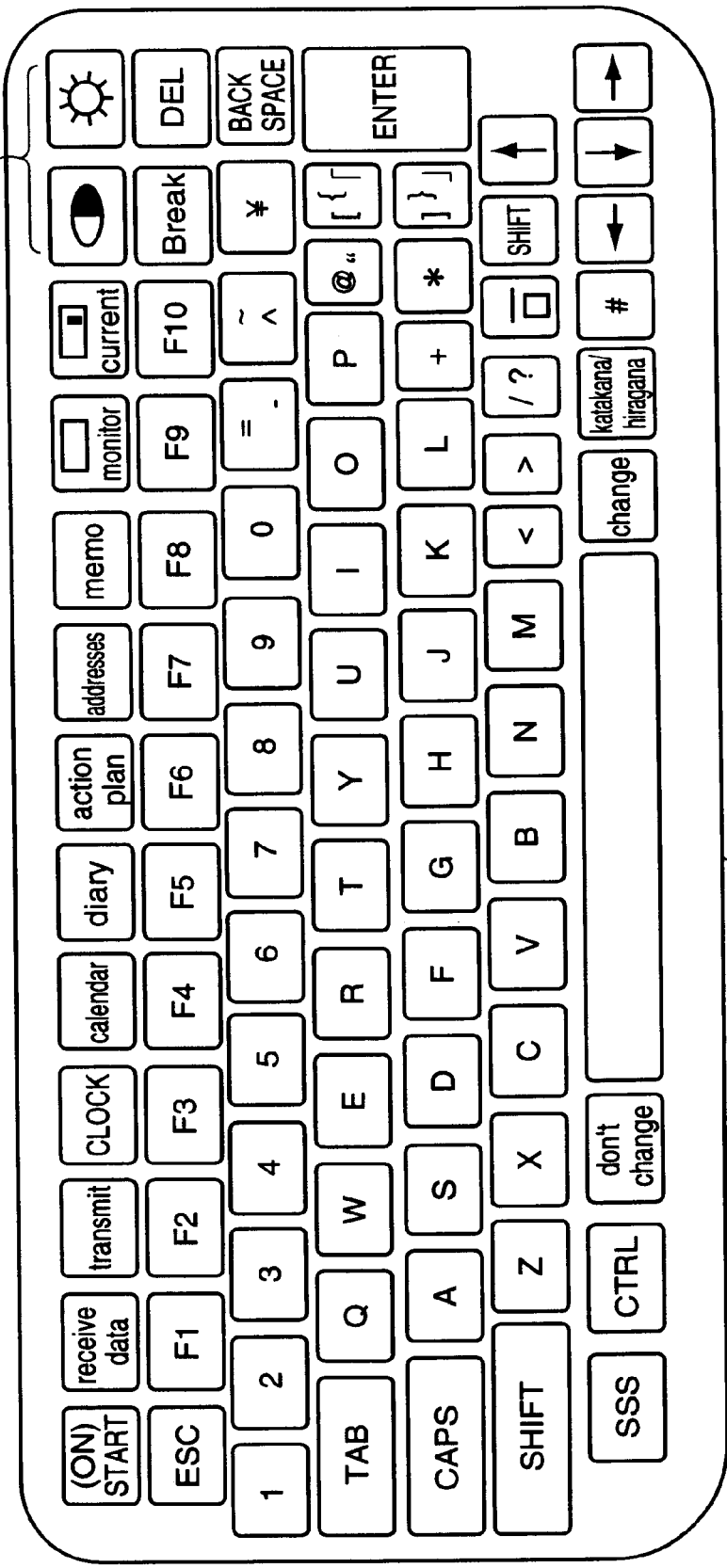
FIG. 4 is a plan view showing an example configuration of a portable personal computer keyboard of a first embodiment of the present invention.
Figure 5:
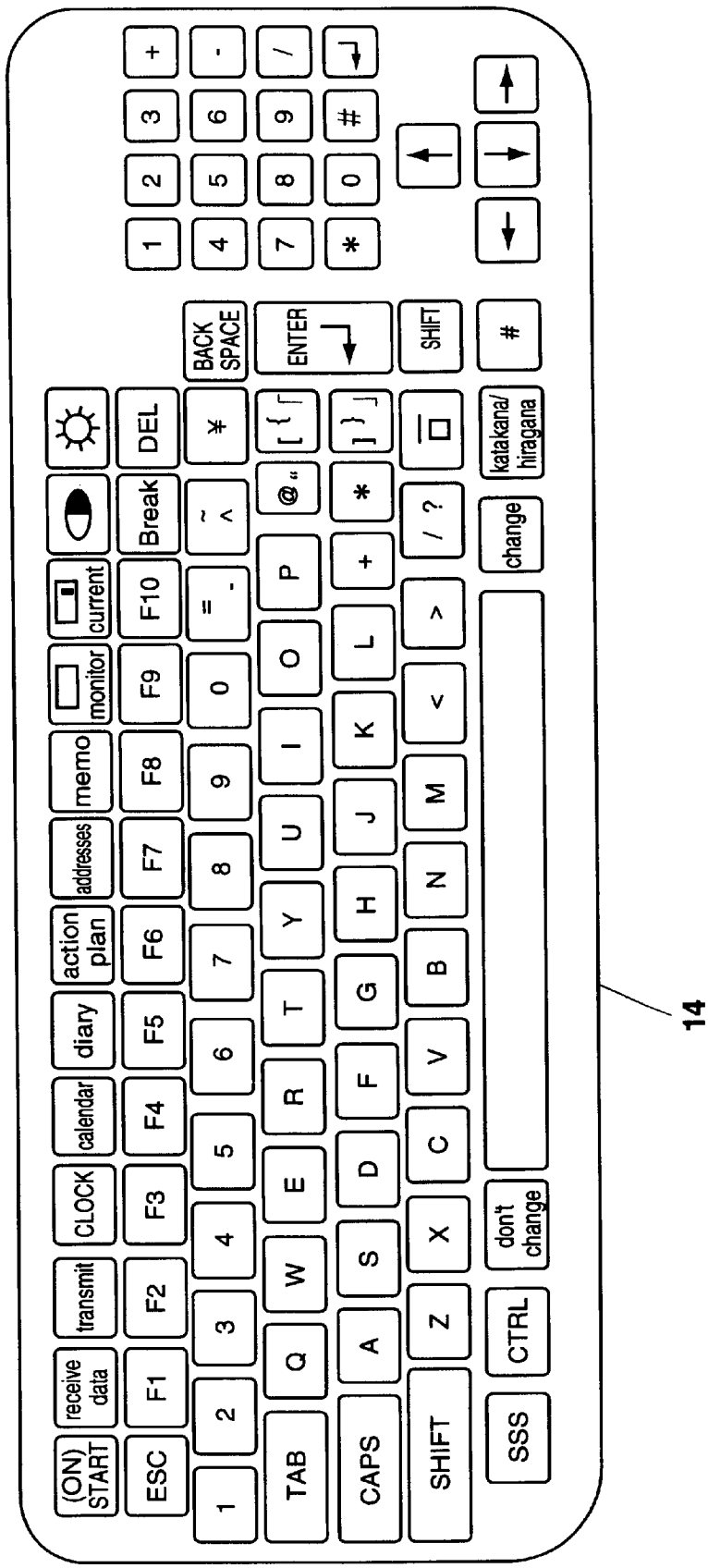
FIG. 5 is a plan view showing an example configuration of a desktop personal computer keyboard of a first embodiment of the present invention.

FIG. 4 shows an example configuration of the keyboard 3 of the portable personal computer 1. As shown in FIG. 4, keys allotted to various functions are also provided in addition to keys operated when alphanumeric characters are inputted. The various functions allotted to each key are then executed when these keys are selected. This keyboard 3 has basically the same key arrangement as the keyboard 14 of the desktop personal computer 11, i.e. as shown in FIG. 5, the keyboard 3 has a configuration that is a scaled-down (similar) version of the keyboard 14 of the desktop personal computer 11. Basically the same operations can therefore be carried out whether using the portable personal computer 1 or the desktop personal computer 11 and various information can therefore be inputted. As a result, for example, when a user that is used to operating the keyboard 14 who possesses a portable personal computer 1 that the user seldom uses moves somewhere else and operates the keyboard 3, lack of understanding of the key arrangement and the inability to perform operations rapidly can be avoided.

However, is possible for the keyboard 14 to be provided with more keys because this keyboard has a greater surface area than the keyboard 3. For example, as shown in FIG. 5, other configurations in addition to the key arrangement that is the same as that for the keyboard 3 shown in FIG. 3 are also possible, such as the provision for an additional numeric key pad etc.

Figure 6:
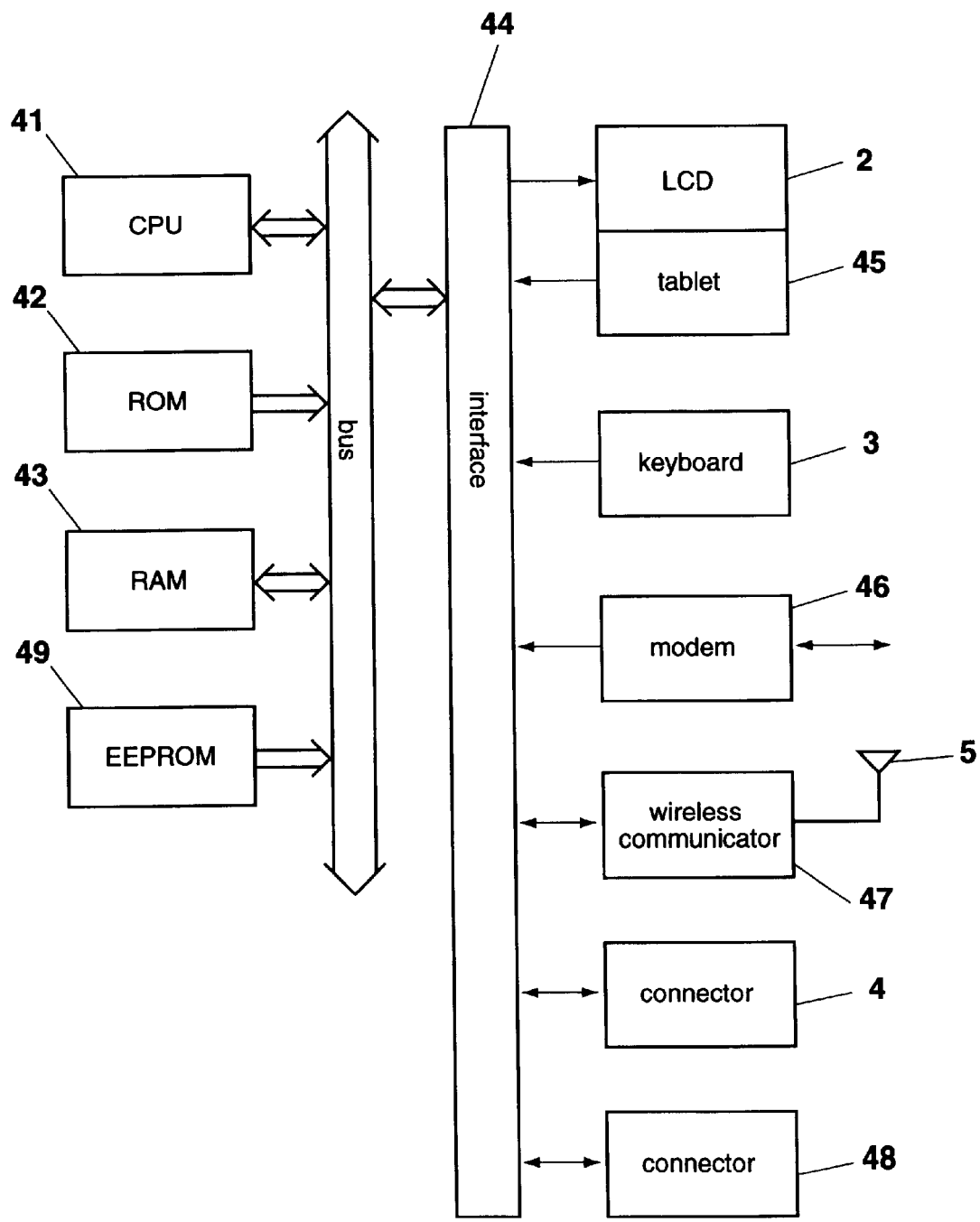
FIG. 6 is a block view showing an example configuration of the internal parts of a portable personal computer of the first embodiment of the present invention.

FIG. 6 shows an example configuration for the internal parts of the portable personal computer 1. Here, a CPU 41 is for executing various processes in accordance with a program stored in the ROM 42. A RAM 43 is for temporarily storing various information, and for temporarily storing various data necessary when a CPU 61 executes various processes. An EEPROM 49 ensures that essential data etc. is stored after a power supply switch (not shown in the drawings) is turned off. An interface 44 is for carrying out interface processing between the CPU 41 and each of the various input/output devices, with an the LCD 2 and a tablet 45 being connected to this interface 44. The tablet 45 is for inputting characters and graphics by hand using an attached pen (not shown in the drawings).

In addition to the connector 4 for the keyboard 3 and the desktop personal computer 11, a modem 46 connected to a network is also connected to this interface 44. The modem 46 is connected to a communications line such a telephone line, ISDN line or network etc. via the wire terminal 6, with data being transmitted and received to computers and portable information terminals of other people via this communications line. A wireless communicator 47 is also connected to the interface 44 so that wireless communications can be carried out with a prescribed base station 21-*i* via an antenna 5. A connector 48 capable of being connected to other devices (for example, cameras, CD-ROM drives, etc.) is then connected to this interface 44.

Figure 7:
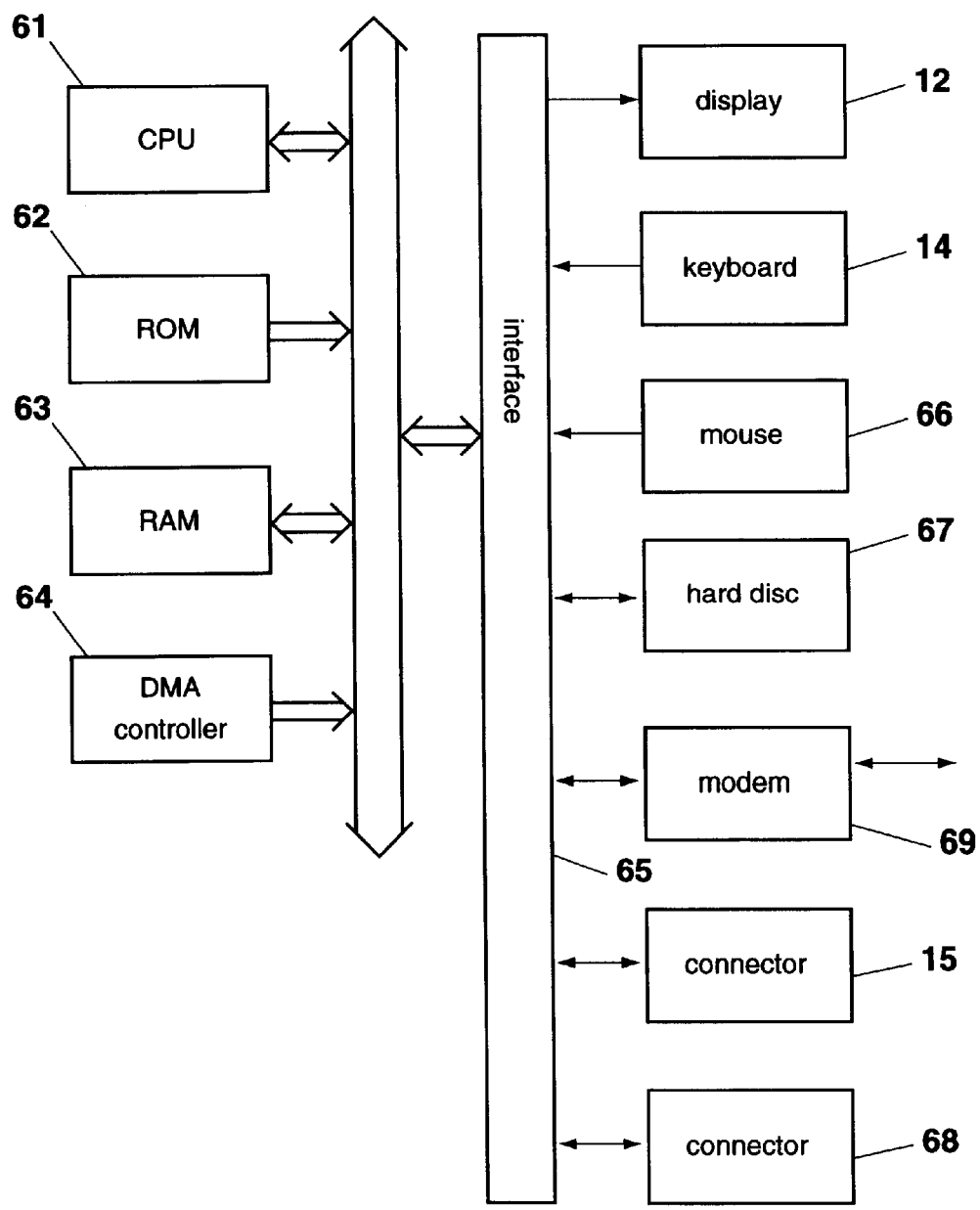
FIG. 7 is a block view showing an example configuration of the internal parts of a desktop personal computer of the first embodiment of the present invention.

FIG. 7 shows an example configuration of the internal parts of the desktop personal computer 11. The CPU 61 is for executing various processes in accordance with a program stored in a ROM 62. Various information is temporarily stored at the RAM 63, as is data necessary for the CPU 61 to execute various processes as appropriate. The DMA controller 64 controls the transfer of data between RAM 63 and RAM 64 when the desktop personal computer 11 and the portable personal computer 1 are connected to each other via the connectors 4 and 15.

The interface 65 is for interfacing between the CPU 61, the DMA controller 64 and each of the various input/output devices. In addition to the display 12, keyboard 14 and the connector 15, a mouse 66 and a hard disc 67 for recording large amounts of information are connected to this interface 65. Further, a connector 68 capable of being connected to other devices (for example, optical discs and floppy discs etc. for CD-ROM drives) is also connected to this interface 65, as is a modem 69 connected to a network. This modem 69 is connected to a communications line such a telephone line, ISDN line or network etc. via the wired terminal 17 and, with data being transmitted and received to and from the portable personal computer 1 and computers and portable information terminals of other users via this communications line.

As described above, the portable personal computer 1 and the desktop personal computer 11 are basically independant personal computers. The CPU 41 of the portable personal computer 1 and the CPU 61 of the desktop personal computer 11 therefore execute processes independently in accordance with the program stored at the ROM 42 of the portable personal computer 1 and the program stored at ROM 62 of the desktop personal computer 11, respectively. These processes are the same as processes occurring in usual personal computers and their description will therefore be omitted.

Next, the operation will be described for the case shown in FIG. 3 where the connector 4 of the portable personal computer 1 is connected to the connector 15 of the desktop personal computer 11 so that the two devices become as a single unit.

When the connector 4 of the portable personal computer 1 and the connector 15 of the desktop personal computer 11 are connected together as shown in FIG. 3, these connections are detected by the CPU 41 and the CPU 61.

Figure 8:
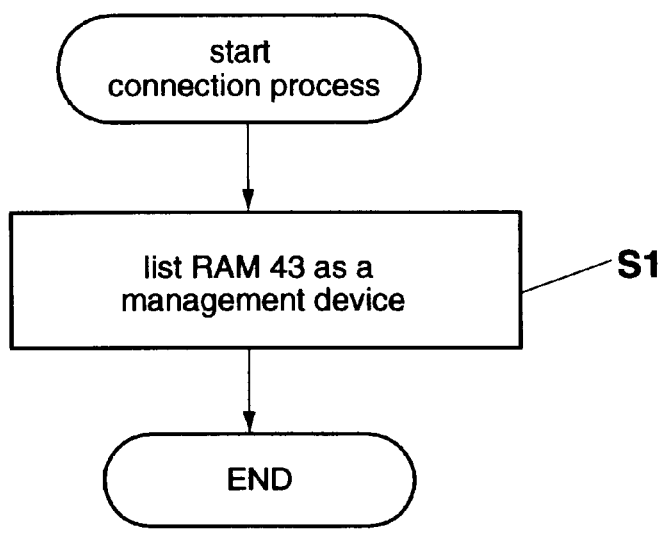
FIG. 8 is a flowchart showing an example of a process for the desktop personal computer when connected with the portable personal computer of the first embodiment of the present invention.

The process shown in the flowchart of FIG. 8 is executed when the CPU 61 of the desktop personal computer 11 detects the connection of the portable personal computer 1, i.e. the CPU 61 lists the RAM 43 and the EEPROM 49 of the portable personal computer 1 as a single management device of the desktop personal computer 11 (step S1). In this way the CPU 61 can directly access the RAM 43 and EEPROM 49 of the portable personal computer 1 in the same way as when accessing the RAM 63 that is built into this CPU 61.

Figure 9:
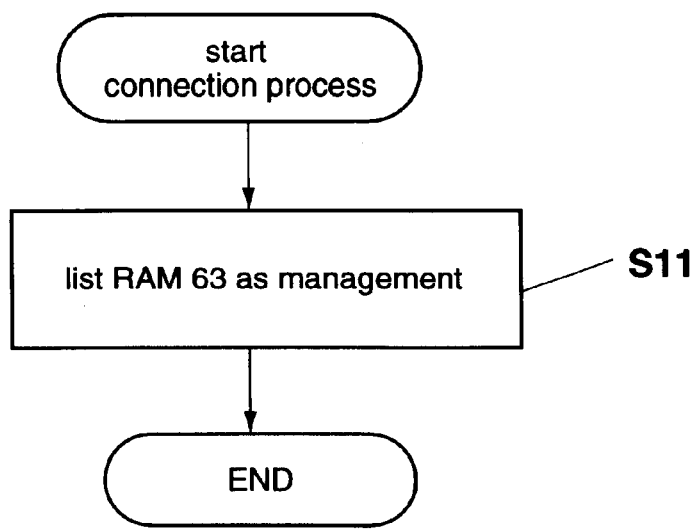
FIG. 9 is a flowchart showing an example of a process for the portable personal computer when connected to the desktop personal computer of the first embodiment of the present invention.

Similarly, the process shown in the flowchart of FIG. 9 is executed when the CPU 41 of the portable personal computer 1 detects the connection of the desktop personal computer 11, i.e. in step S11, the RAM 63 of the portable personal computer 1 is listed as one management device of the portable personal computer 1 (step S11). In this way, the CPU 41 can directly access the RAM 63 of the desktop personal computer 11 in the same way as the when accessing the RAM 43 that is built into this CPU 41.

Figure 10:
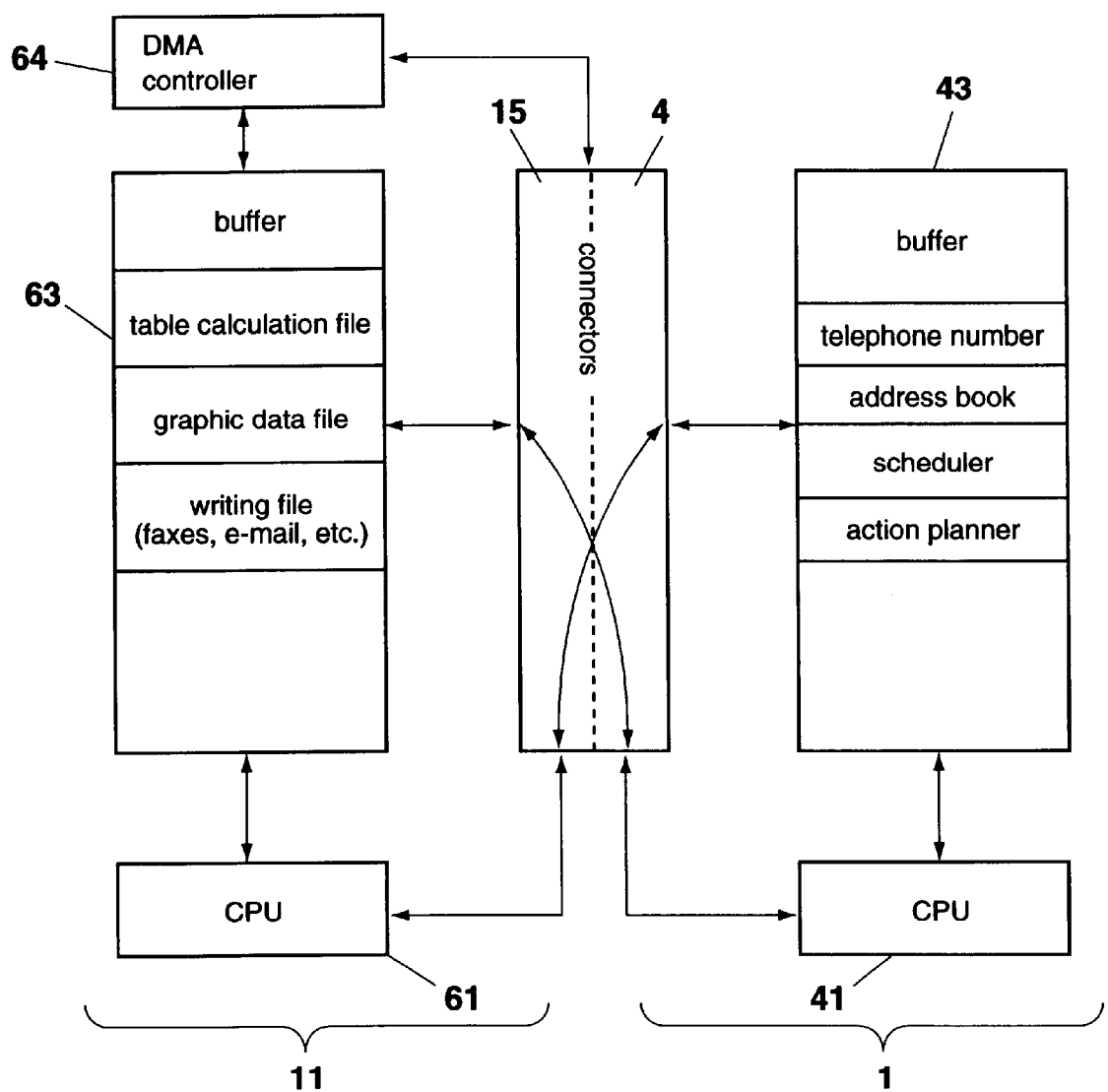
FIG. 10 is a view illustrating the sending and receiving of data between the portable personal computer and the desktop personal computer of the first embodiment of the present invention.

FIG. 10 schematically shows the flow of information between the portable personal computer 1 and the desktop personal computer 11 when connected via the connectors 4 and 15. As shown in FIG. 10, the portable personal computer 1 has a basic electronic notebook function, with data file information (information files) such as telephone numbers, address books, schedules and plans of action etc. inputted by operating the keyboard 3 being stored in the EEPROM 49. This information is read out by the CPU 41 as necessary and stored in the RAM 43 (in FIG. 8, the RAM 43 and the EEPROM 49 are drawn as a single body). The CPU 41 can then access the RAM 43 and the EEPROM 49 directly when reading and writing data. Further, the CPU 41 can also generate data for faxes and electronic mail (also referred to as "e-mail") etc., and can read prescribed data directly from the RAM 63 of the portable personal computer 1 (the curve of FIG. 8).

On the other hand, with the desktop personal computer 11, the CPU 61 executes various other functions in addition to executing word-processing and table calculation functions, making data for faxes and electronic mail and executing processing for making graphics data. The results of these processes, i.e. the generated data files (information files) are stored in the RAM 63, and can be transferred to the hard disc 67 for recording as necessary. The CPU 61 can therefore directly access the hard disc 67 and the RAM 63 when reading and writing prescribed data to the hard disc 67 and the RAM 63. Further, the CPU 61 can directly read out prescribed data from the RAM 43 and the EEPROM 49 of the portable personal computer 1 (the curve of FIG. 8).

As described above, in addition to the CPU 41 of the portable personal computer 1 being able to directly access the RAM 43 and the EEPROM 49 to read and write data and the CPU 61 of the desktop personal computer 11 being able to directly access the RAM 63 to read and write data, in this first embodiment, the CPU 41 of the portable personal computer 1 can directly access the RAM 63 of the desktop personal computer 11 and the CPU 61 of the desktop personal computer 11 can directly access the RAM 43 and the EEPROM 49 of the portable personal computer 1. An example of each of the various operations in this case is described in the following with reference to flowcharts.

Figure 11:
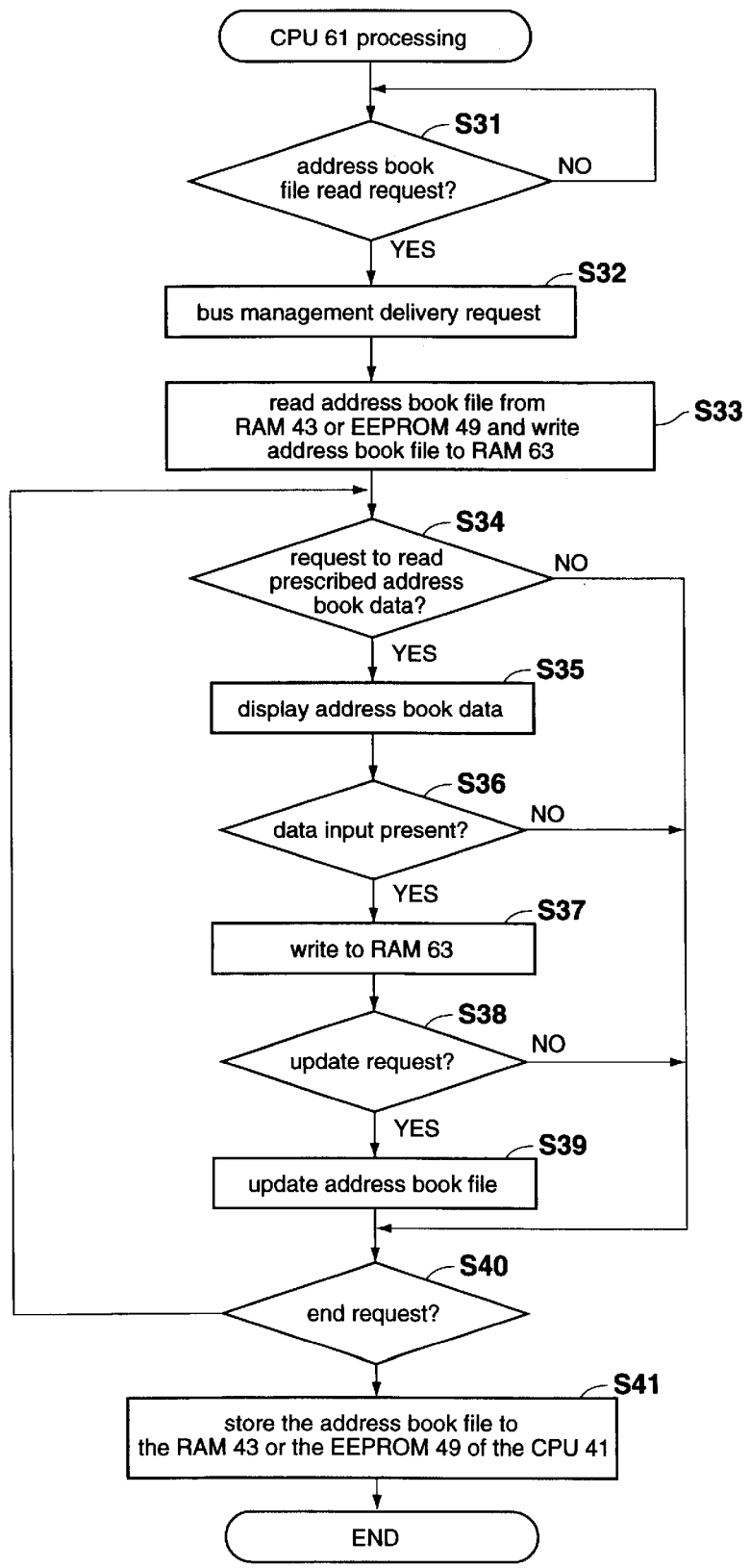
FIG. 11 is a flowchart illustrating the operation of the desktop personal computer when processing address book files of the first embodiment of the present invention.

FIG. 11 is a flowchart of the process for reading, newly inputting and revising address book files stored in the RAM 43 (or EEPROM 49) of the portable personal computer 1 at the desktop personal computer 11.

First, in step S31, the CPU 61 of the desktop personal computer 11 makes a determination as to whether or not an instruction to read an address book file has been inputted via the keyboard 14 (address book key operation) or the mouse 16. When it is determined that a read instruction has been inputted, step S32 is proceeded to and the CPU 61 makes a request for bus management hand-over to the CPU 41 of the portable personal computer 1. When this request is received by the CPU 41, the CPU 41 hands over management authority of the bus within the portable personal computer 1 to the CPU 61.

In step S33, the CPU 61 that bus management authority has been handed over to directly accesses the RAM 43 and the EEPROM 49 already listed as management devices and reads the address book file. The CPU 61 then temporarily stores the read-out address book file in a buffer region of the RAM 63 and outputs address book file display data to the display 12 for displaying. The above operation is not executed when it is determined in step S31 that an instruction to read the address book file has not been given.

Step S34 is proceeded to and the CPU 61 makes a determination as to whether or not an instruction to read prescribed data has been inputted via the keyboard 14 or the mouse 16. When it is determined that an instruction to read has been inputted, step S35 is proceeded to, the CPU 61 reads the requested address book data from the RAM 63, and this data is outputted to the display 12 and displayed.

Next, in step S36, the CPU 61 determines whether or not a write instruction has been inputted via the keyboard 14 or the mouse 16. When a write instruction has been inputted, step S37 is proceeded to. The CPU 61 then temporarily stores new address and revised address data inputted as a result of the user operating the keyboard 14 in a buffer region of the RAM 63 and step S38 is proceeded to. In step S38, the CPU 61 determines whether or not an instruction to write to (update) the address book has come from the keyboard 14 or the mouse 16. When an update instruction has been inputted, the CPU 61 then updates the address book file in step S39 based on data stored in the buffer region of the RAM 63.

Step 40 is then proceeded to and the CPU 61 makes a determination as to whether or not an instruction to end the address book processing has been inputted via the keyboard 14 or the mouse 16. When an instruction to end the address book processing is inputted, step S41 is proceeded to. The CPU 61 then executes a process to transfer the address book file stored in RAM 63 to the RAM 43 or EEPROM 49 of the portable personal computer 1.

Figure 12:
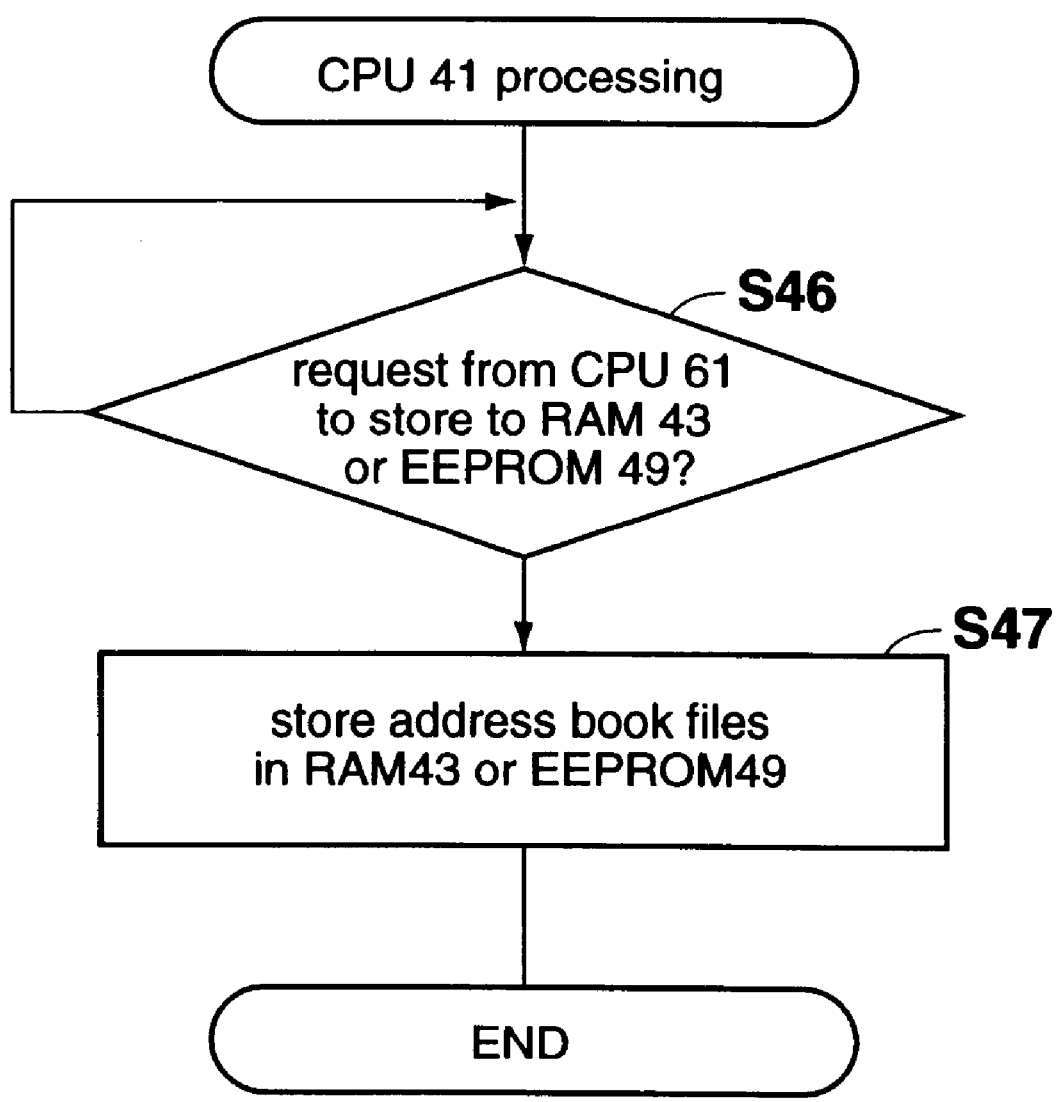
FIG. 12 is a flowchart illustrating the operation of the portable personal computer when processing address book files of the first embodiment of the present invention.

Namely, in order to execute this transfer processing, the CPU 61 requests hand-over of management authority of the bus to the CPU 41. The CPU 41 then makes a determination as to whether or not a request for hand-over of management authority of the bus has come from the CPU 61 in step S45 of the flowchart of FIG. 12. When there has been a bus management authority hand-over, step S46 is proceeded to and the CPU 41 reads the address book file stored in the buffer region of the RAM 63 and stores this file in a buffer region of the RAM 43 or the EEPROM 49 of the portable personal computer 1 via the connector 15 of the desktop personal computer 11 and the connector 4 of the portable personal computer 1. When the address book file is stored on the RAM 43, the CPU 41 records the address book region of the EEPROM 49 from the buffer region of the RAM 43 as necessary and this operation then ends. On the other hand, when bus management authority is not handed-over in step S45, the following operation is not executed.

It is also possible to hand-over bus management authority to the DMA controller 64 in place of handing bus management authority over to the CPU 41. In this case, in order to execute this transfer processing, the CPU 61 requests hand-over of bus management authority to the DMA controller 64. When hand-over of bus management authority is received, the DMA controller 64 DMA transfers address book file stored in the buffer region of RAM 63 to the buffer region of the RAM 43 or the EEPROM 49 (listed as a management device of the CPU 61 in step S1 of FIG. 7) of the portable personal computer 1 via the connector 15 of the desktop personal computer 11 and the connector 4 of the portable personal computer 1. If this address book file is transferred to the RAM 43, the CPU 41 then transfers this address book file from the buffer region of the RAM 43 to the address book region of the EEPROM 49 as necessary and for recording in the EEPROM 49.

Further, the process in step S35 to step S39 is skipped when there is no instruction for reading prescribed address book data inputted in step S34. Moreover, when no write instruction is inputted in step S36, the process from step S37 to step S39 is skipped. When no update instruction is inputted in step S38, the process in step S39 is skipped.

When processing of the address book does not end in step S40, step S31 is returned to and the process thereafter is repeated.

Next, the operation when an electronic mail function (transmission and receival) is executed with the personal computers together as one is described.

The portable personal computer 1 has an electronic mail function (for wireless communications or wired communications). The CPU 61 of the desktop personal computer 11 then executes the process shown in the flowchart in FIG. 12 and the CPU 41 of the portable personal computer 1 executes the process in the flowchart shown in FIG. 13 when transmission data generated by the portable personal computer 1 or the desktop personal computer 11 is transmitted using the electronic mail function of the portable personal computer 1. The portable personal computer 1 and the desktop personal computer 11 have communications functions consisting of a function (word processor function) for making data to be sent as electric mail or as faxes and a function for sending and receiving the electric mail itself. However, in the example described below, a description is given of the particular case where transmission data for electric mail generated at the desktop personal computer 11 is transmitted by the wireless communication function of the portable personal computer 1.

First, a description is given of the operation of the electronic mail transmission process. The CPU 61 of the desktop personal computer 11 makes a determination in step S51 of the flowchart of FIG. 12 as to whether or not an instruction to process transmission of electronic mail has been inputted from the keyboard (operation of transmission key) 14 or the mouse 16. If the CPU 61 determines that an instruction to process the transmission of electronic mail has been inputted, step S52 is proceeded to and a request is made to the CPU 41 of the portable personal computer 1 to execute electronic mail transmission. If an electronic mail transmission process is not requested in step S51, the following operation is not executed.

Figure 13:
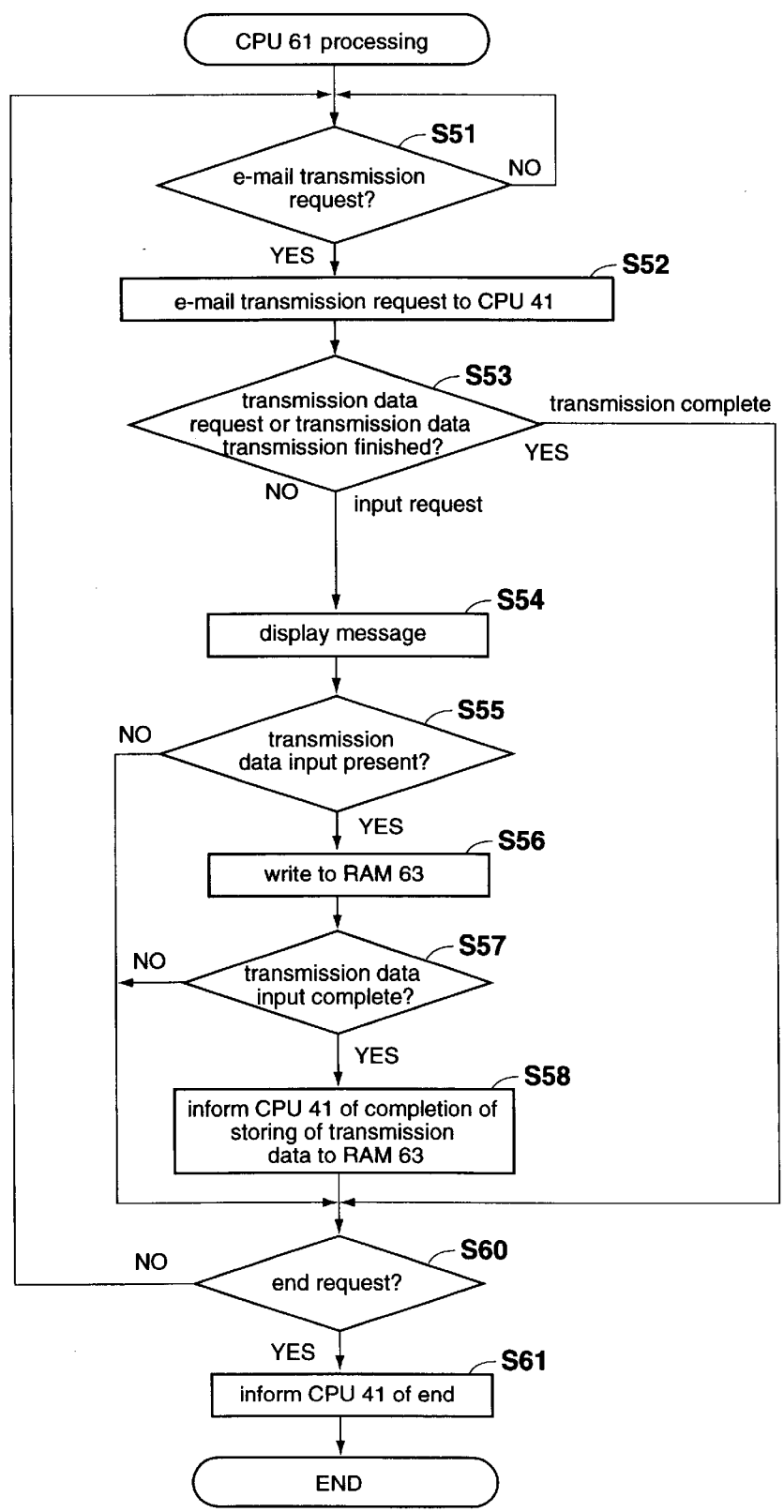
FIG. 13 is a flowchart illustrating the operation of the desktop personal computer when sending electronic mail in the first embodiment of the present invention.
Figure 14:
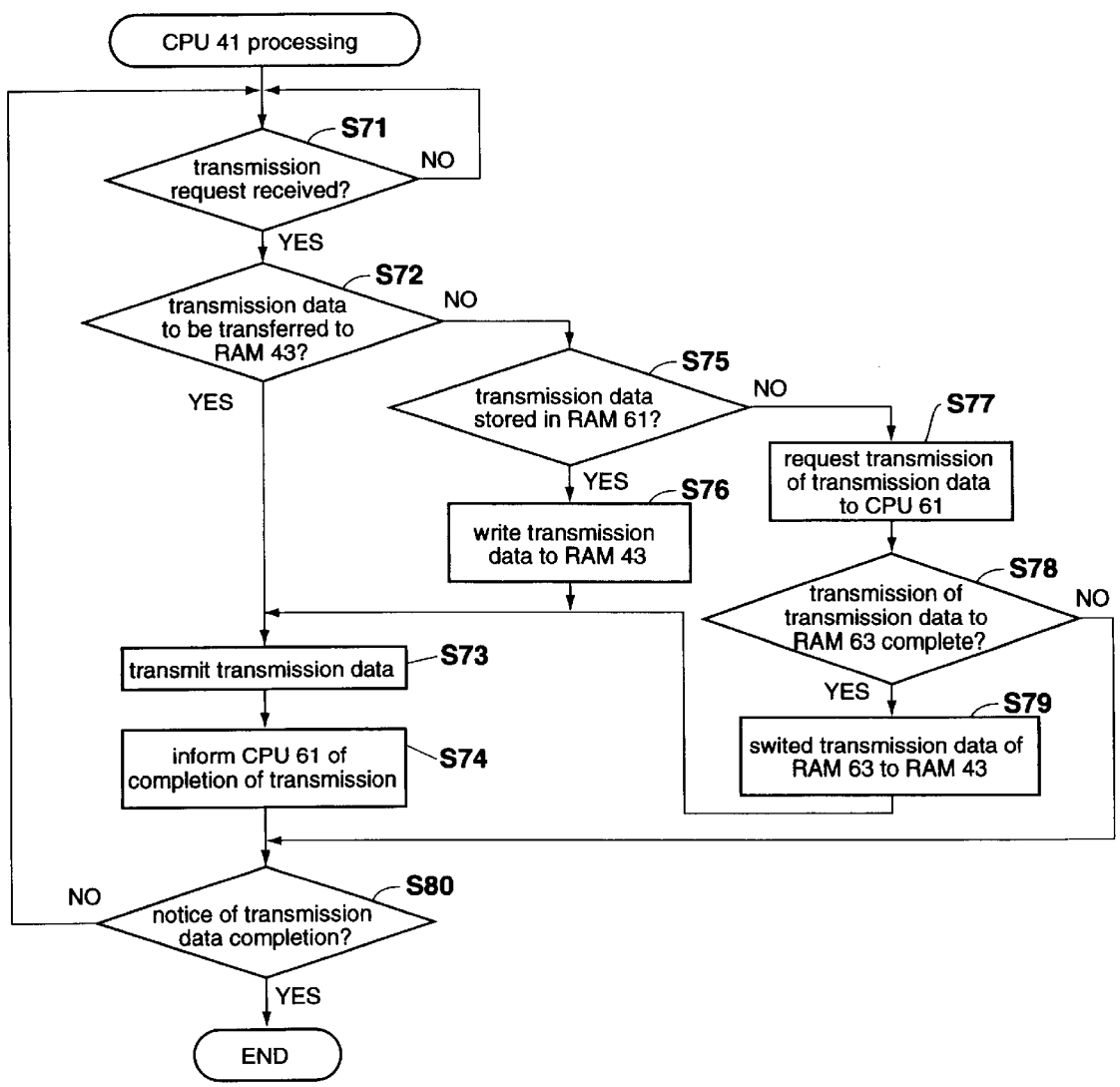
FIG. 14 is a flowchart illustrating the operation of the portable personal computer when sending electronic mail in the first embodiment of the present invention.

The CPU 41 of the portable personal computer 1 executes the process shown in the flowchart of FIG. 13 in response to this request. First, the CPU 41 determines whether or not a request to transmit electronic mail is supplied from the CPU 61. When a request to transmit electronic mail has been received, step S72 is proceeded to and the CPU 41 determines whether or not transmission data is stored in the buffer region of the RAM 43. When the transmission data has all been inputted due to operations of the keyboard 3 of the portable personal computer 1 so as to be all stored in the buffer region of the RAM 43, step S73 is proceeded to. The CPU 41 then reads this transmission data from the buffer region of the RAM 43 and this transmission data is supplied to the wireless communicator 47 to be modulated within this wireless communicator 47. The wireless communicator 47 changes this data into waves to be transmitted via an antenna 48. The transmitted waves are then received at the nearest base station 21-*i* and then transmitted to a prescribed destination via further base stations 21-*i* or the network 22. Step S74 is proceeded to and the CPU 41 notifies CPU 61 of completion of transmission of the transmission data. When it is determined in step S71 that an electronic mail transmission process has not been requested, the following operation is not executed.

When it is determined in step S72 that transmission data is not stored in the buffer region of the RAM 43, step S75 is proceeded to the CPU 41 determines whether or not transmission data is stored in the buffer region of RAM 63 of the desktop personal computer 11. When transmission data is stored in the buffer region of RAM 63, step S76 is proceeded to and the CPU 41 reads transmission data stored in the buffer region of the RAM 63 and stores this transmission data in the buffer region of the RAM 43. Step S73 is then proceeded to and this transmission data is read from the buffer region of the RAM 43 and transmitted by the wireless communication function. On the other hand, when transmission data is not stored in the buffer region of the RAM 63 in step S75, step S77 is proceeded to and the CPU 41 makes a request to the CPU 61 for input of transmission data.

The CPU 61 of the desktop personal computer 11 then determines whether or not notification of the end of transmission of transmission data or a request on inputting of transmission data has been inputted from the CPU 41. When end of transmission of transmission data has been requested, the CPU 61 skips step S54 to step S59. On the other hand, when a request for input of transmission data has been inputted, step S54 is proceeded to, the CPU 61 proceeds to step S56 and a message urging the inputting of transmission data is generated for displaying on the display 12. As a result of this, a message of, for example, "please input transmission data" is displayed on the display 12. At this time, the CPU 41 communicates with the CPU 61 and the CPU 41 causes the same message to be displayed on the LCD 2 as necessary.

When the user sees this message, the user operates the keyboard 14 to input the transmission data. In step S55, the CPU 61 determines whether or not transmission data has been inputted via the keyboard 14 or the mouse 16. When transmission data has been inputted, step S56 is proceeded to, the inputted transmission data is temporarily stored in the buffer region of the RAM 63 and step S57 is proceeded to.

Next, in step S57, the CPU 61 determines whether or not an instruction of completion of inputting of the transmission data from the keyboard 14 or the mouse 16 has been inputted. When an instruction of completion of the input of transmission data is inputted, step S58 is proceeded to and the CPU 61 notifies the CPU 41 that electronic mail transmission data is stored in the buffer region of the RAM 63.

The CPU 41 of the portable personal computer 1 then makes a determination in step S78 as to whether or not storage of transmission data to the buffer region of the RAM 63 of the desktop personal computer 11 is complete using notification from the CPU 61. When storing of the transmission data to the buffer region of the RAM 63 is not carried out, the processes of step S73 and step S74 are skipped. On the other hand, when it is determined in step S78 that storage of transmission data to the buffer region of the RAM 63 is complete, step S79 is proceeded to. The CPU 41 then reads transmission data from the RAM 63 and stores this transmission data in the buffer region of the RAM 43. Step S73 is then proceeded to and this transmission data is transmitted using the wireless communication function.

It is also possible to transfer transmission using the DMA controller 64 rather than using the CPU 41 to store transmission data in the buffer region of the RAM 43 from the buffer region of the RAM 63. In this case, the CPU 41 requests hand-over of bus management to the DMA controller 64. When this request is received at the DMA controller 64, bus management authority is handed-over and the transmission data for the electronic mail stored in the RAM 63 is DMA transferred to the RAM 43.

When an instruction to input transmission data is not inputted in step S55, the process of steps S57 to S59 is skipped. Further, when an instruction of completion of transmission data is not inputted in step S58, the process of step S59 is skipped.

Moreover, the CPU 61 of the desktop personal computer 11 makes a determination as to whether or not notification of completion of the transmission process for the electric mail has been inputted in step S60 from the keyboard 14 or the mouse 16. When notification of completion of the transmission process for the electronic mail is inputted, the CPU 61 proceeds to step S61, notification of completion of the transmission process for the electronic mail is given to the CPU 41 and the electronic mail transmission process is complete. On the other hand, when the electronic mail transmission process is not complete in step S60, step S51 is returned to and the process thereafter is repeated.

Further, when the CPU 41 of the portable personal computer 1 makes a determination as to whether or not notification of completion of the electronic mail transmission process has been inputted from the CPU 61 in step S77, the CPU 41 ends the electronic mail transmission process. On the other hand, when notification of the end of the transmission process for the electronic mail is not inputted, the CPU 41. returns to step S71 and the process thereafter is repeated.

Figure 15:
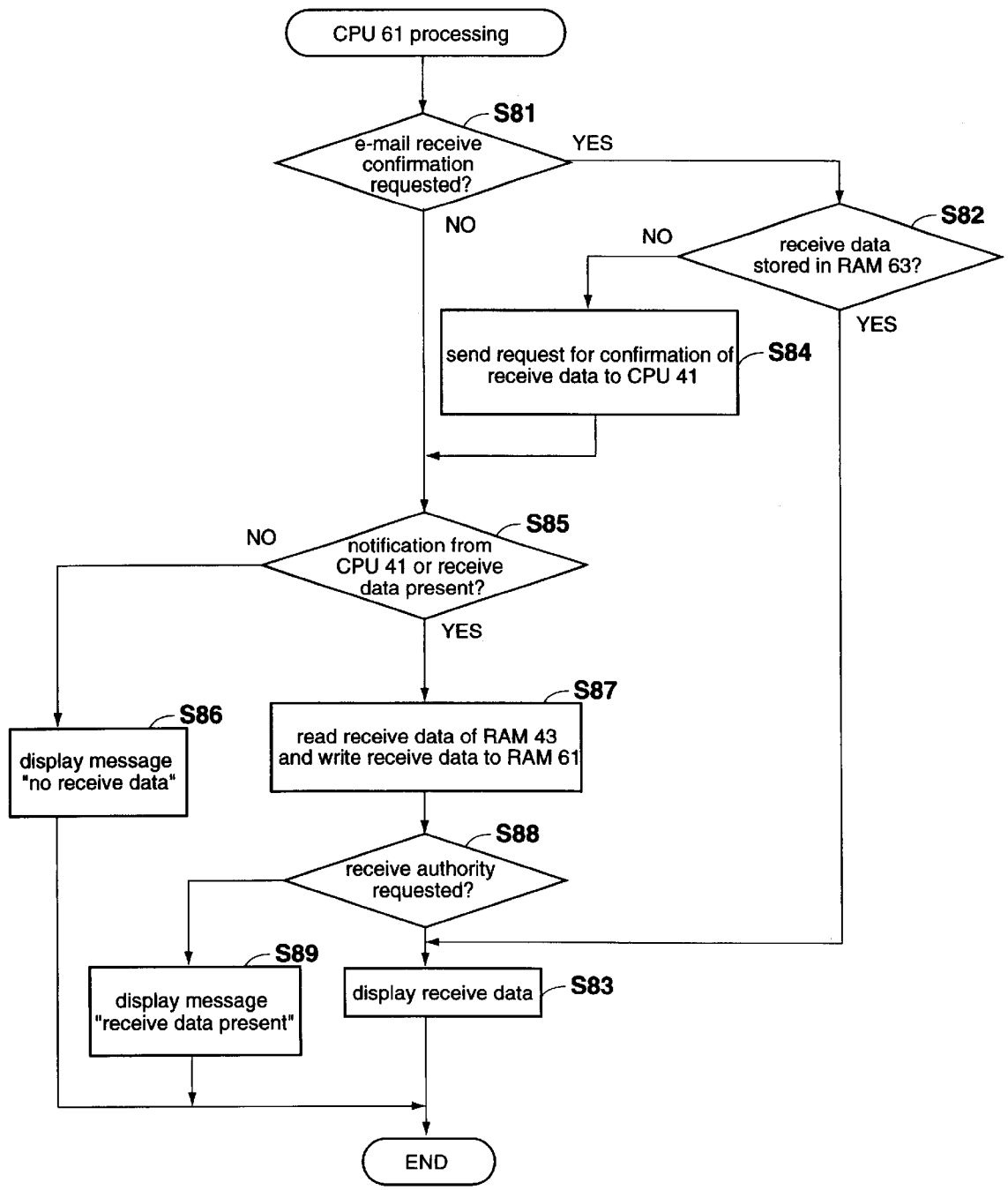
FIG. 15 is a flowchart illustrating the operation of the desktop personal computer when receiving electronic mail in the first embodiment of the present invention.
Figure 16:
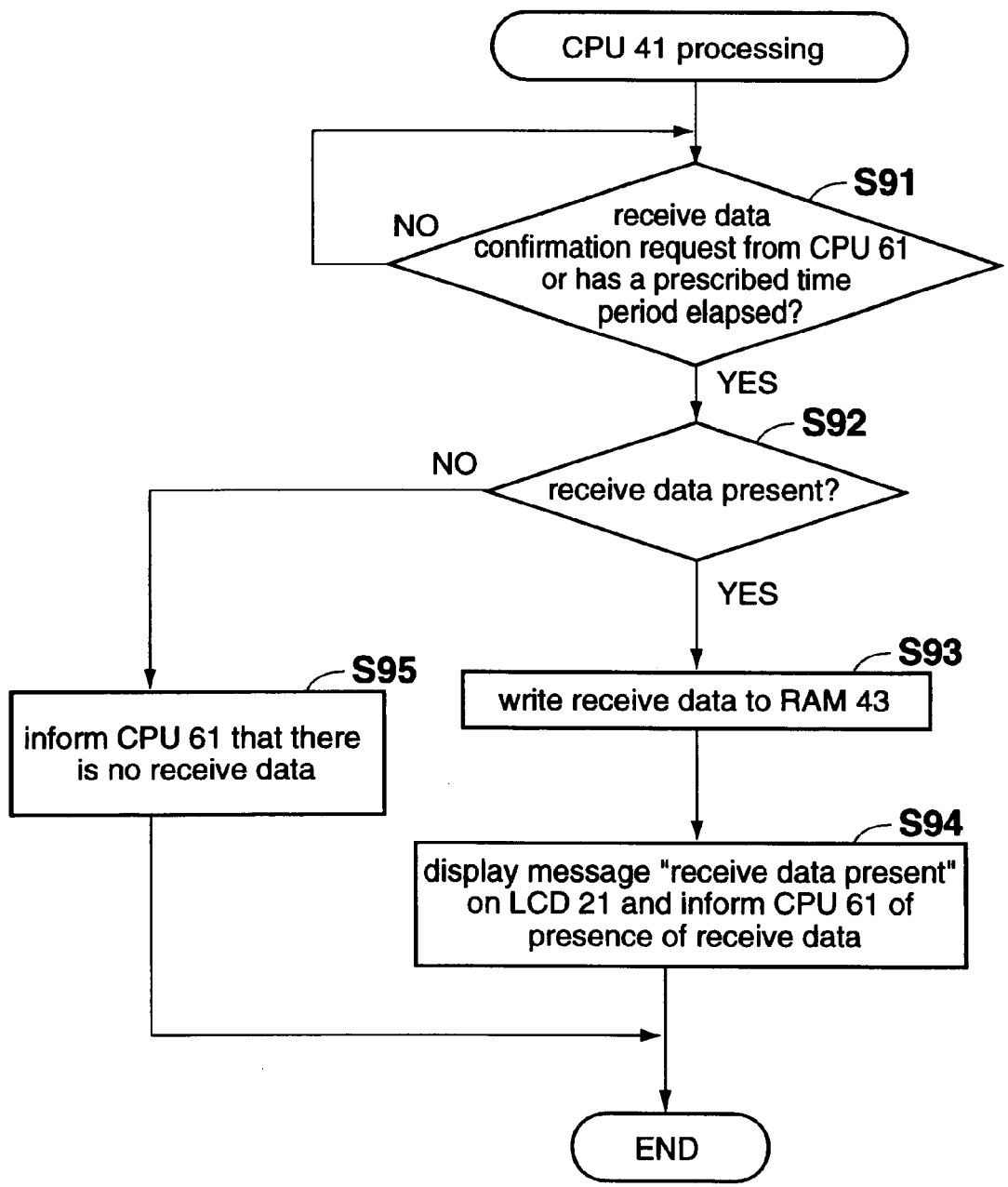
FIG. 16 is a flowchart illustrating the operation of the portable personal computer when receiving electronic mail in the first embodiment of the present invention.

Next, a description is given of the process for receiving electronic mail. When an electronic mail function is executed to receive electronic mail data from the network 22 or the base station 21-$i$, the CPU 61 of the desktop personal computer 11 executes the process shown in FIG. 15 and the CPU 41 of the portable personal computer 1 executes the process shown in the flowchart of FIG. 16.

First, the CPU 61 of the desktop personal computer 11 makes a determination as to whether or not a receive data confirmation of display instruction has been inputted from the keyboard 14 (operation of the data receive key) or the mouse 16 in step S81. When receive data confirmation or a display instruction is inputted, the CPU 61 proceeds to step S82, and a determination is made as to whether or not receive data is stored in the buffer region of the RAM 63. In step S82, when receive data is stored in the buffer region of RAM 63, step S83 is proceeded to. The CPU 61 then reads this receive data from the buffer region of the RAM 63 and supplies this data to the display 12 for displaying, with the display operation for the receive data confirmation then being complete. On the other hand, when receive data is not stored in the buffer region of the RAM 63, step S84 is proceeded to. The CPU 61 then supplies a request for confirmation of whether or not the receive data has been received at the portable personal computer 1 to the CPU 41 of the portable personal computer 1 and step S85 is proceeded to.

In step S81, when receive data confirmation of a display instruction is not inputted, step S85 is proceeded to and the CPU 61 makes a determination in step S85 as to whether or not notification (notification as to whether or not receive data is written in the buffer region of the RAM 43) has been inputted from the CPU 41 of the portable personal computer 1. When notification is not inputted from the CPU 41 or the notification from the CPU 41 is notification that there is no receive data, step S86 is proceeded to and the CPU 61 displays a message of, for example, "no receive data present" on the display 12. At this time, the CPU 41 causes the same message to be displayed on the LCD 2 and this operation is complete.

On the other hand, when notification is inputted from the CPU 41 and this notification is notification that receive data is present, step S87 is proceeded to. The CPU 61 then reads the receive data from the buffer region of the RAM 43 and stores this receive data in the buffer region of the RAM 63. Step S88 is then proceeded to and the CPU 61 makes a determination as to whether or not receive data confirmation or a display instruction has been inputted from the keyboard 14 or the mouse 16. When receive data confirmation or a display instruction is inputted, step S83 is proceeded to, the CPU 61 reads out receive data from the buffer region of the RAM 63 and this receive data is supplied to the display 12 and displayed. On the other hand, when receive data confirmation or a display instruction is not inputted from the keyboard 14 or the mouse 16 in step S88, step S89 is proceeded to and a message displaying the presence of receive data is displayed on the display 12, with this operation then being complete. In the above, the operation of this kind of CPU 61 is executed when there is a request from the keyboard 14 or the mouse 16.

Further, in step S91, the CPU 41 of the portable personal computer 1 determines whether or not a request for confirmation of receive data has been inputted and determines whether or not a prescribed period of time has elapsed. When a receive data confirmation request is inputted or a set prescribed period of time has elapsed, the CPU 41 proceeds to step S92 and a determination is made as to whether or not electronic mail data from the base station 21-$i$ exists. When receive data exists, the CPU 41 proceeds to step S93 and a process is executed so as to store the receive data in the buffer region of the RAM 43. Namely, the wireless communicator 47 detects data sent from the base station 21-$i$ via the antenna 48 and the detected data is modulated. The demodulated receive data is then stored in the buffer region of the RAM 43 and step S94 is proceeded to. When it is determined that a receive data confirmation request is not inputted in step S91 and the prescribed time period has not elapsed, the following operation is not executed.

Next, in step S93, the CPU 41 displays the writing of receive data to the buffer region of the RAM 43 on the LCD 2 (the receive data only when a prescribed period of time is determined to have elapsed) and informs the CPU 61 of the desktop personal computer 11 that receive data is stored in the buffer region of the RAM 43, with this operation then being complete. Further, when it is determined that the electronic mail data does not exist in step S92, CPU 41 notifies the CPU 61 that there is no receive data in step S95 and this operation is complete. The receive data stored in the buffer region of the RAM 63 can also be recorded on a hard disc. In the above, the operation of the CPU 41 is executed every time there is a confirmation instruction from the CPU 61 or every time a prescribed period of time passes.

In this way, direct access can be achieved from one CPU to another RAM (i.e. from the CPU 41 of the portable personal computer 1 to the RAM 63 of the desktop personal computer 11, or from the CPU 61 of the desktop personal computer 11 to the RAM 43 of the portable personal computer 1). It is therefore no longer necessary for information files to be saved separately at each RAM and operativity is improved.

According to the information processing system and the information processing method of the present invention, when an information processing device and another information processing device are connected, the storage parts of one can be listed as management parts of the other, one can be directly accessed by the other and information can be written and read. Information management therefore becomes easy and operativity is improved.

Further, according to the information processing device and information processing method of the present invention, when, for example, a portable information processing device is connected to a desktop information processing device, the storage parts of the desktop information processing device are listed as management devices of the portable information processing device and direct access is therefore possible. Moreover, when desktop-type information is connected to a portable type information processing device, the storage part of this portable type information processing device is listed as a management device of the desktop information processing device, accessed directly, and information can then be written or read. Information management is therefore simple in either case and operativity is therefore improved.

Second Embodiment

Figure 17:
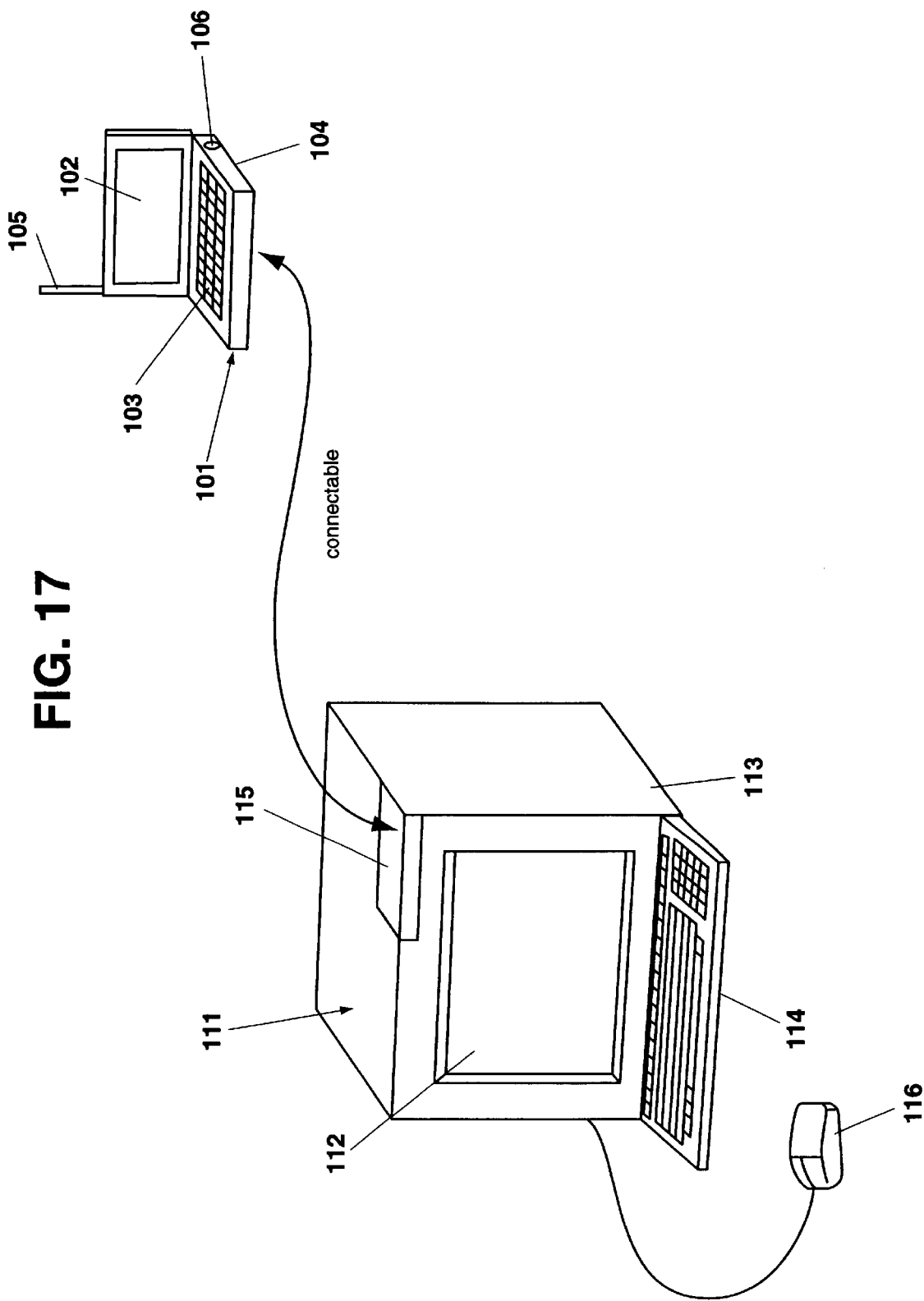
FIG. 17 is a view showing an example configuration of an information processing system of a second embodiment of the present invention.

FIG. 17 shows an example configuration of a second embodiment of an information processing system of the present invention. In the following example of a second embodiment, as in the case of the aforementioned first embodiment, a description is given of an information processing system employing a portable personal computer and a desktop personal computer, but the present invention can also be applied to other information processing devices.

This information processing system basically comprises a portable personal computer 101 and a desktop personal computer 111. The portable personal computer 101 comprises an LCD 102 for displaying characters and graphics and a keyboard 103 operated when inputting various instructions. Further, a connector 104 is provided on the underside of the portable personal computer 101 in such a manner as to connect directly with a connector 115 formed on the upper side of the desktop personal computer 111.

The desktop personal computer 111 comprises a display 112 for displaying characters and graphics, a main body 113 having circuitry for processing various information built-in and a keyboard 114 and mouse 116 operated at the time of inputting each of the various instructions.

Figure 18:
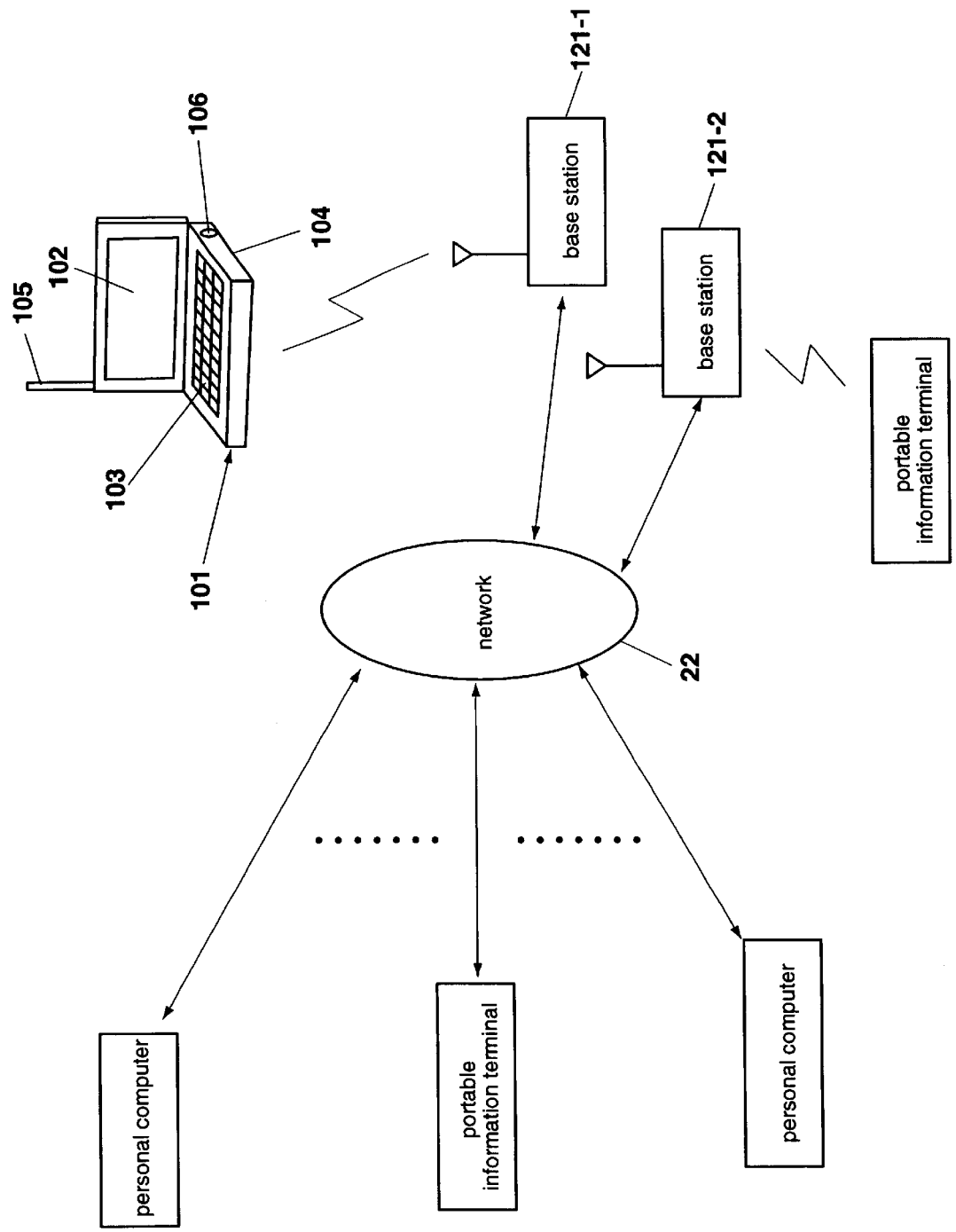
FIG. 18 is a view showing an example of connecting the information processing system of the second embodiment of the present invention to a communications system.

As shown in FIG. 17, the portable personal computer 101 has an antenna for wireless use 105 and a wire terminal 106 so as to be capable of both wireless communication and wired communication. For example, as shown in FIG. 18, by utilizing this wireless communication function, when the user carries the portable personal computer 101 to a certain place, communication can then be carried out using a wireless line with the nearest base station 121-$i$ (i=1, 2, ... ). The base station 121-$i$ can then connect to other peoples, personal computers and portable information terminals via a network 122 or further base station 121-$i$ so that data can be transmitted and received to and from other personal computers and portable information terminals. Further, with the wired communication function, the user can send and receive data to and from other peoples computers and portable information terminals by connecting the wired terminal 106 and the network 122.

Figure 19:
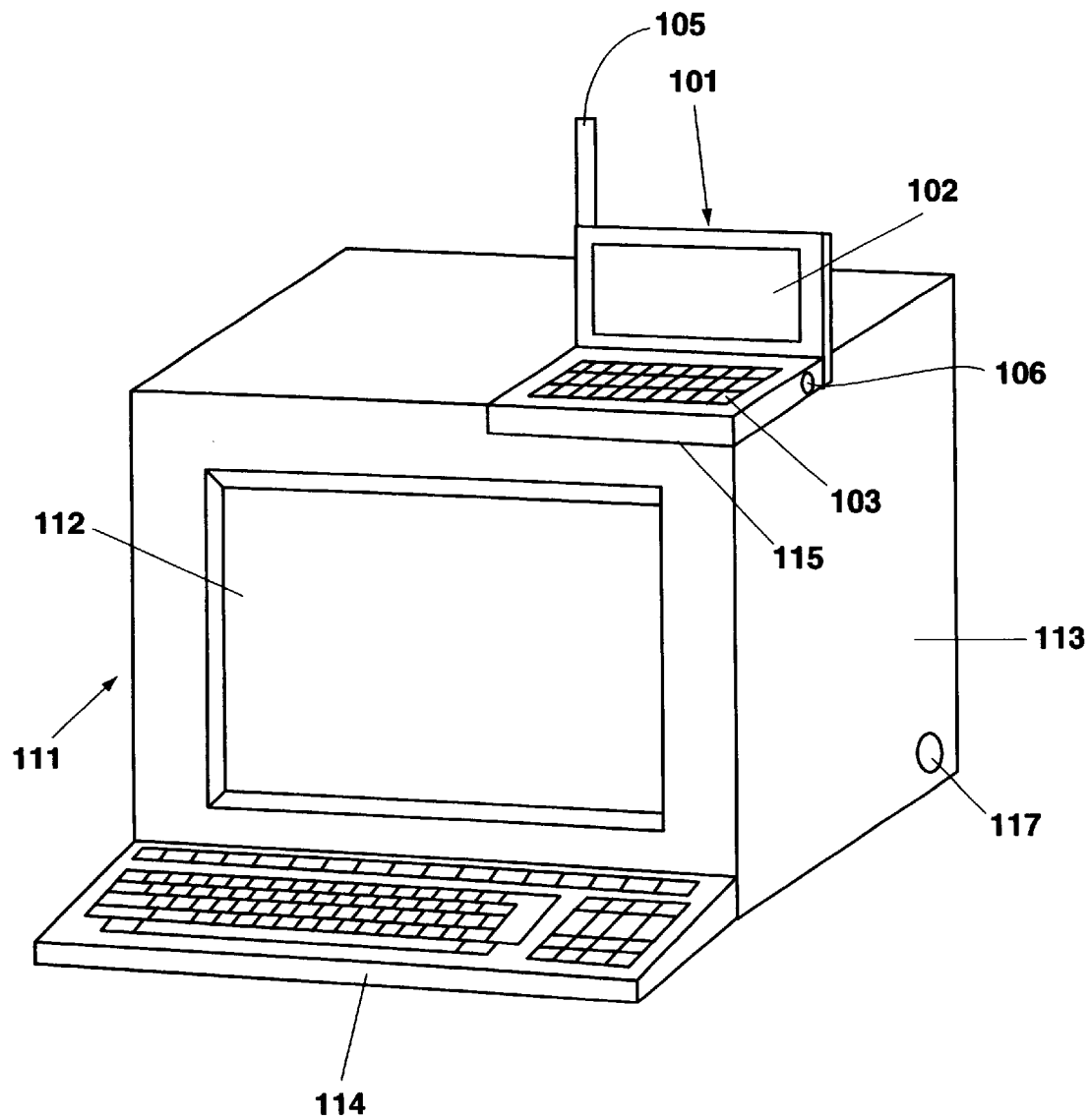
FIG. 19 is an oblique view showing a portable personal computer and a desktop personal computer of the second embodiment of the present invention in a connected state.

Further, in the second embodiment, as well as the portable personal computer 101 and the desktop personal computer 111 being able to carry out each of the various processes independently of each other, as shown in FIG. 19, these items can also be utilized as a single device by directly connecting the connector 104 of the portable personal computer 101 to the connector 115 of the desktop personal computer 111.

In this way, communication is carried out with other peoples other peoples' personal computers and portable information terminals with the portable personal computer 101 and the desktop personal computer 111 as a single device, data for communications use is usually generated by generating and processing data on the side of the desktop personal computer 111. This communications data is then transferred to the side of the portable personal computer 101. Communication is then carried out with other peoples' personal computers or portable information terminals via a network or base station in the same way as for the above method as a result of the portable personal computer 101 employing a wired communications function or a wireless communications function. The details of this communications operation will be described later.

Figure 20:
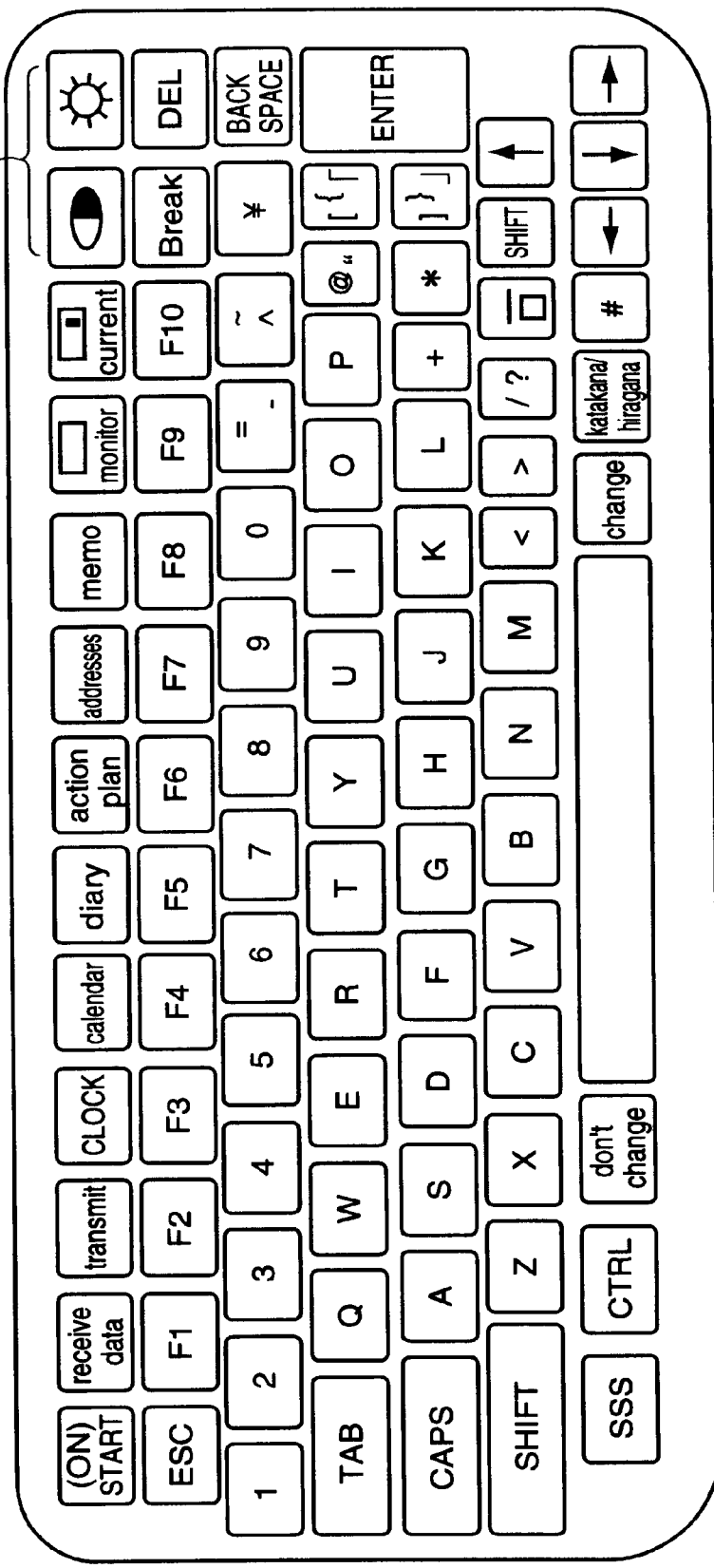
FIG. 20 is a plan view showing an example configuration of a portable personal computer keyboard of a second embodiment of the present invention.
Figure 21:
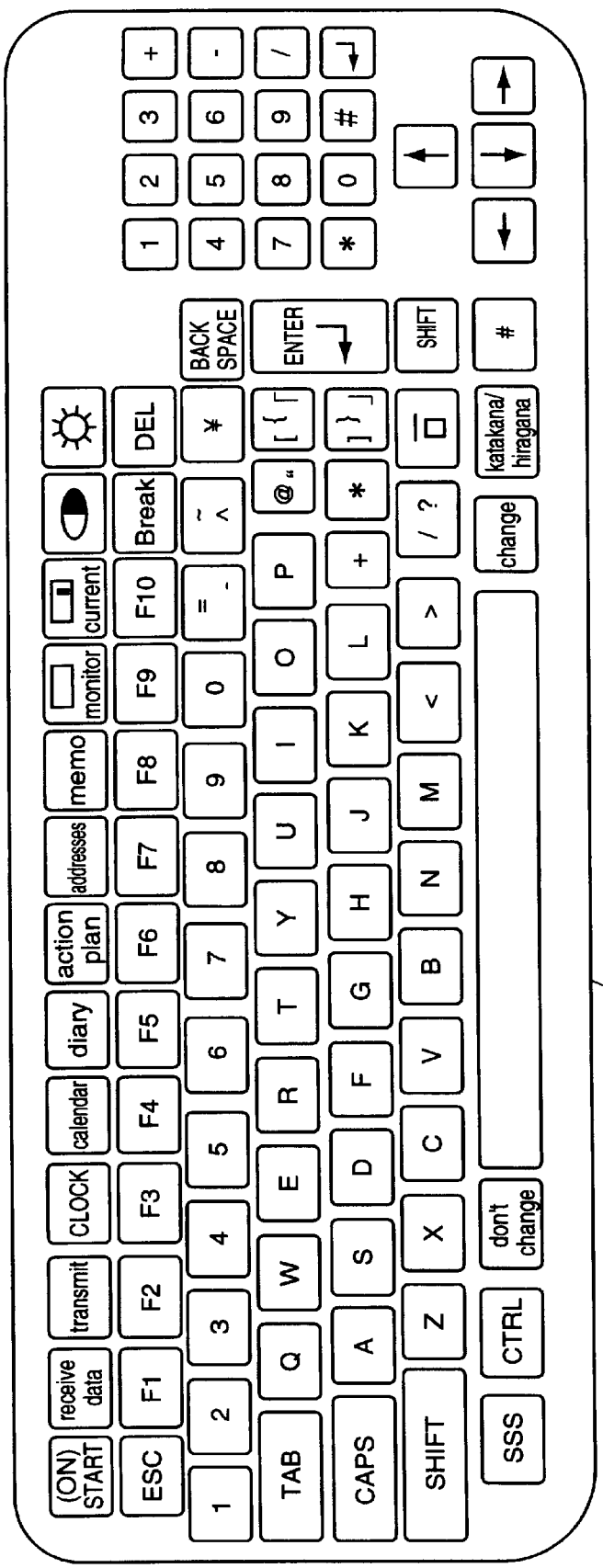
FIG. 21 is a plan view showing an example configuration of a desktop personal computer keyboard of a second embodiment of the present invention.

FIG. 20 shows an example configuration of the keyboard 103 of the portable personal computer 101. As shown in FIG. 20, keys allotted to various functions are also provided in addition to keys operated when alphanumeric characters are inputted. The various functions allotted to each key are then executed when these keys are selected. This keyboard 103 has basically the same key arrangement as the keyboard 114 of the desktop personal computer 111, i.e. as shown in FIG. 21, the keyboard 103 has a configuration that is a scaled-down (similar) version of the keyboard 114 of the desktop personal computer 111. Basically the same operations can therefore be carried out whether using the portable personal computer 101 or the desktop personal computer 111 and various information can therefore be inputted. As a result, for example, when a user that is used to operating the keyboard 114 who possesses a portable personal computer 101 that the user seldom uses moves somewhere else and operates the keyboard 103, lack of understanding of the key arrangement and the inability to perform operations rapidly can be avoided.

However, is possible for the keyboard 114 to be provided with more keys because this keyboard has a greater surface area than the keyboard 103. For example, as shown in FIG. 21, other configurations in addition to the key arrangement that is the same as that for the keyboard 103 shown in FIG. 3 are also possible, such as the provision for an additional numeric key pad etc.

Figure 22:
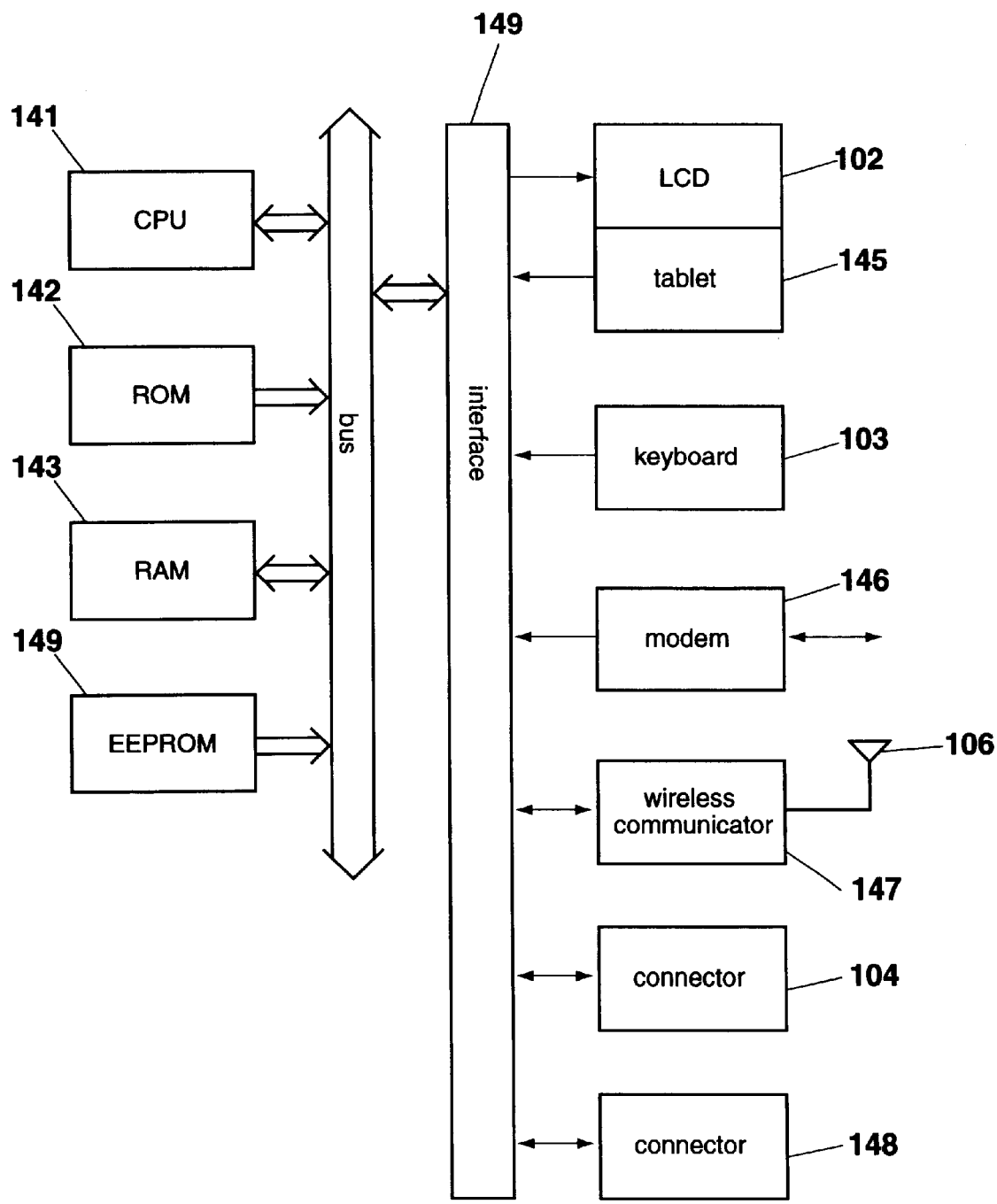
FIG. 22 is a block view showing an example configuration of the internal parts of a portable personal computer of the second embodiment of the present invention.

FIG. 22 shows an example configuration for the internal parts of the portable personal computer 101. Here, a CPU 141 is for executing various processes in accordance with a program stored in the ROM 142. A RAM 143 is for temporarily storing various information, and for temporarily storing various data necessary when a CPU 161 executes various processes. An EEPROM 149 ensures that essential data etc. is stored after a power supply switch (not shown in the drawings) is turned off. An interface 144 is for carrying out interface processing between the CPU 141 and each of the various input/output devices, with an the LCD 102 and a tablet 145 being connected to this interface 144. The tablet 145 is for inputting characters and graphics by hand using an attached pen (not shown in the drawings).

In addition to the connector 104 for the keyboard 103 and the desktop personal computer 111, a modem 146 connected to a network is also connected to this interface 144. The modem 146 is connected to a communications line such a telephone line, ISDN line or network etc. via the wire terminal 106, with data being transmitted and received to computers and portable information terminals of other people via this communications line. A wireless communicator 147 is also connected to the interface 144 so that wireless communications can be carried out with a prescribed base station 121-i via an antenna 105. A connector 148 capable of being connected to other devices (for example, cameras, CD-ROM drives, etc.) is then connected to this interface 144.

Figure 23:
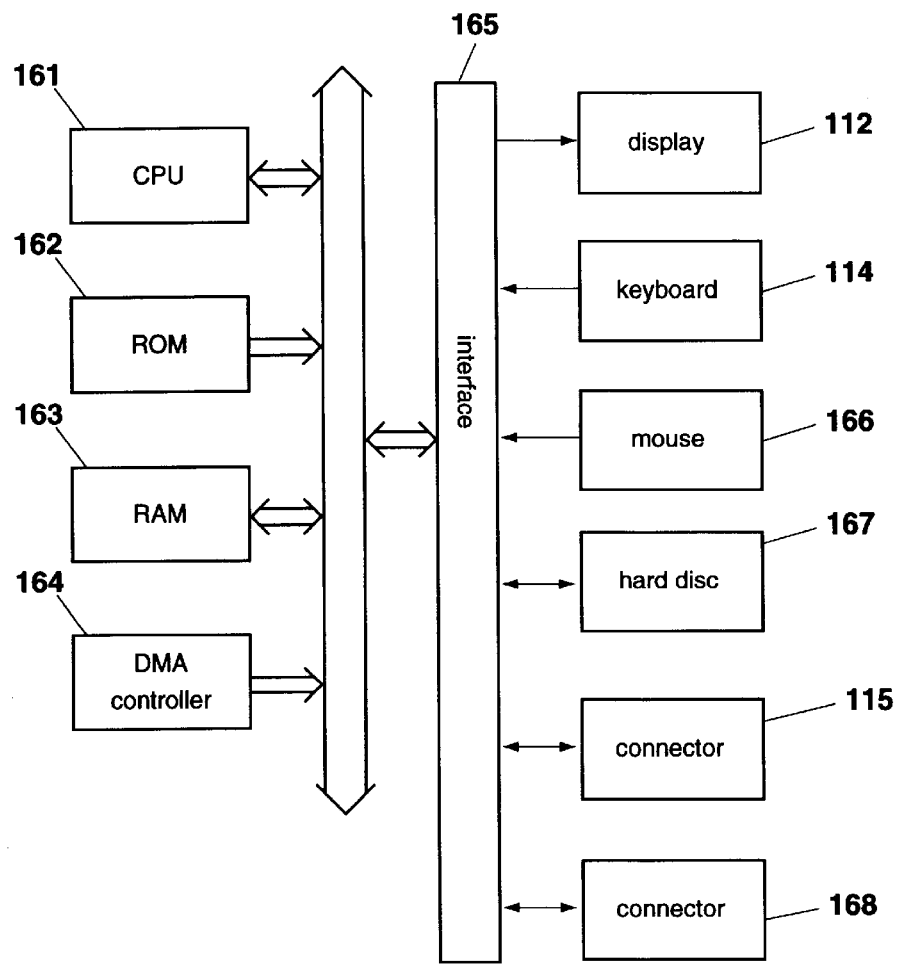
FIG. 23 is a block view showing an example configuration of the internal parts of a desktop personal computer of the second embodiment of the present invention.

FIG. 23 shows an example configuration of the internal parts of the desktop personal computer 111. The CPU 161 is for executing various processes in accordance with a program stored in a ROM 162. Various information is temporarily stored at the RAM 163, as is data necessary for the CPU 161 to execute various processes as appropriate. The DMA controller 164 controls the transfer of data between RAM 163 and RAM 164 when the desktop personal computer 111 and the portable personal computer 101 are connected to each other via the connectors 104 and 115.

The interface 165 is for interfacing between the CPU 161, the DMA controller 164 and each of the various input/output devices. In addition to the display 112, keyboard 114 and the connector 115, a mouse 166 and a hard disc 167 for recording large amounts of information are connected to this interface 165. Further, a connector 168 capable of being connected to other devices (for example, optical discs and floppy discs etc. for CD-ROM drives) is also connected to this interface 165.

As described above, the portable personal computer 101 and the desktop personal computer 111 are basically independent personal computers. The CPU 141 of the portable personal computer 101 and the CPU 161 of the desktop personal computer 111 therefore execute processes independently in accordance with the program stored at the ROM 142 of the portable personal computer 101 and the program stored at ROM 162 of the desktop personal computer 111, respectively. These processes are the same as processes occurring in usual personal computers and their description will therefore be omitted.

Next, the operation will be described for the case shown in FIG. 19 where the connector 104 of the portable personal computer 101 is connected to the connector 115 of the desktop personal computer 111 so that the two devices become as a single unit.

When the connector 104 of the portable personal computer 101 and the connector 115 of the desktop personal computer 111 are connected together as shown in FIG. 19, these connections are detected by the CPU 141 and the CPU 161.

Figure 24:
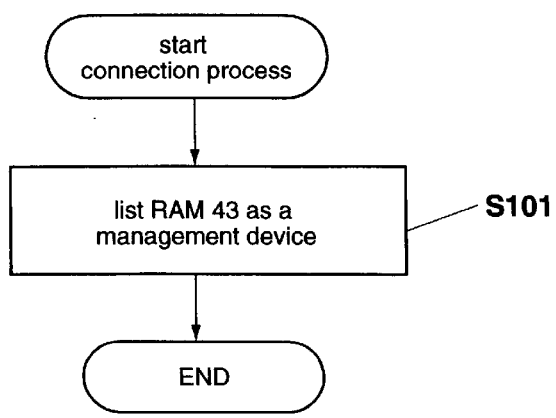
FIG. 24 is a flowchart showing an example of a process for the desktop personal computer when connected with the portable personal computer of the second embodiment of the present invention.

The process shown in the flowchart of FIG. 24 is executed when the CPU 161 of the desktop personal computer 111 detects the connection of the portable personal computer 101, i.e. the CPU 161 lists the RAM 143 and the EEPROM 149 of the portable personal computer 101 as a single management device of the desktop personal computer 111 (step S101). In this way the CPU 161 can directly access the RAM 143 and EEPROM 149 of the portable personal computer 101 in the same way as when accessing the RAM 163 that is built into this CPU 161.

However, when the CPU 141 of the desktop personal computer 111 detects connection with the portable personal computer 101, a process for listing the RAM 163 of the desktop personal computer 111 as a single management device of the portable personal computer 101 is not carried out, i.e. the CPU 141 cannot directly access the RAM 163 of the desktop personal computer 111.

Figure 25:
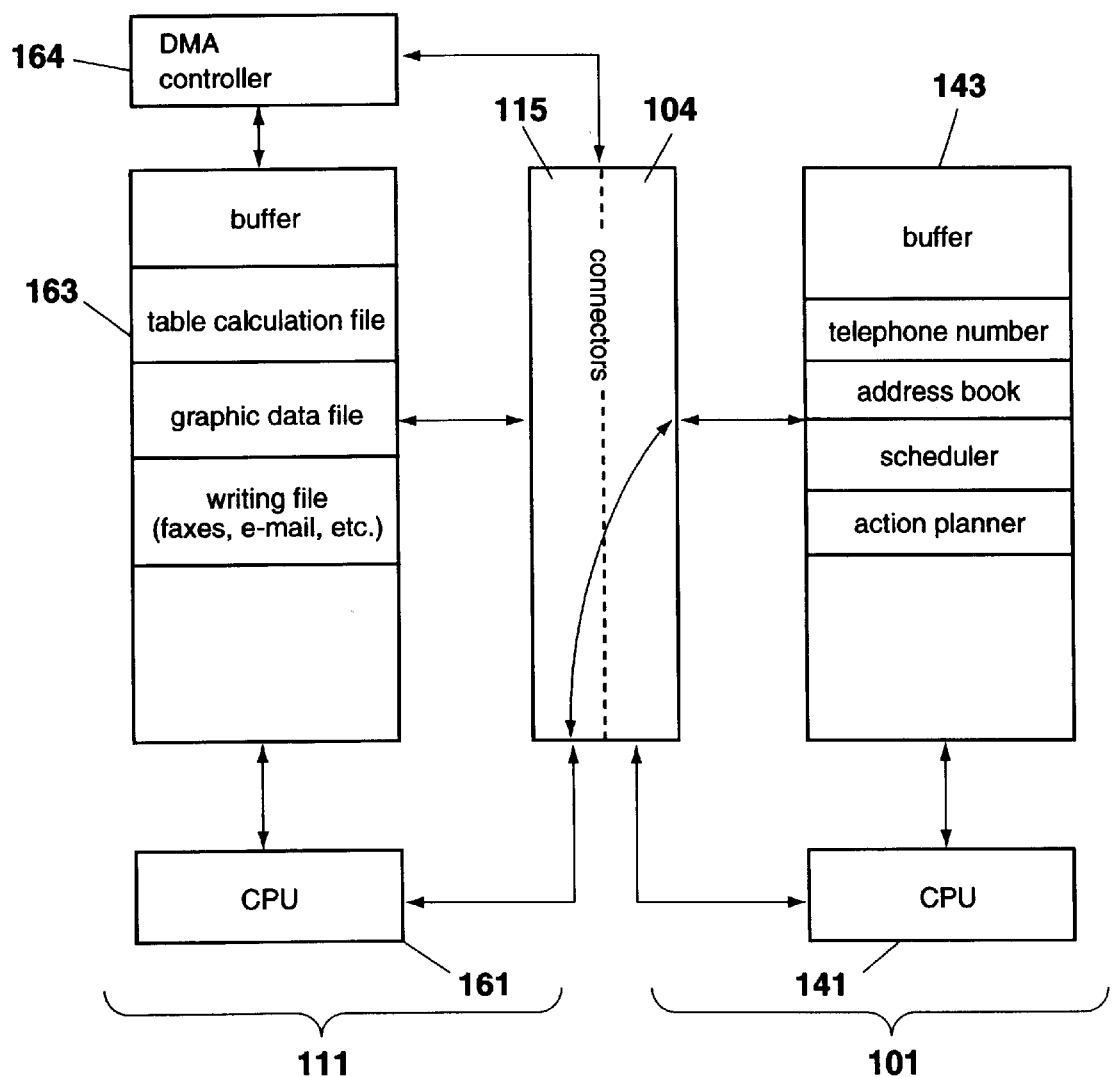
FIG. 25 is a view illustrating the sending and receiving of data between the portable personal computer and the desktop personal computer of the second embodiment of the present invention.

FIG. 25 schematically shows the flow of information between the portable personal computer 101 and the desktop personal computer 111 when connected via the connectors 104 and 115. As shown in FIG. 25, the portable personal computer 101 has a basic electronic notebook function, with data file information (information files) such as telephone numbers, address books, schedules and plans of action etc. inputted by operating the keyboard 103 being stored in the EEPROM 149. This information is read out by the CPU 141 as necessary and stored in the RAM 143 (in FIG. 25, the RAM 143 and the EEPROM 149 are drawn as a single body). The CPU 141 can then access the RAM 143 and the EEPROM 149 directly when reading and writing data. Further, the CPU 141 can also generate data for faxes and electronic mail (also referred to as "e-mail") etc., and can read prescribed data directly from the RAM 163 of the portable personal computer 101 (the curve of FIG. 25).

On the other hand, with the desktop personal computer 111, the CPU 161 executes various other functions in addition to executing word-processing and table calculation functions, making data for faxes and electronic mail and executing processing for making graphics data. The results of these processes, i.e. the generated data files (information files) are stored in the RAM 163, and can be transferred to the hard disc 167 for recording as necessary. The CPU 161 can therefore directly access the hard disc 167 and the RAM 163 when reading and writing prescribed data to the hard disc 167 and the RAM 163.

Further, the CPU 161 can directly read out prescribed data from the RAM 143 and the EEPROM 149 of the portable personal computer 101 (the curve of FIG. 25).

As described above, in addition to the CPU 141 of the portable personal computer 101 being able to directly access the RAM 143 and the EEPROM 149 to read and write data and the CPU 161 of the desktop personal computer 111 being able to directly access the RAM 63 to read and write data, in this second embodiment, the CPU 141 of the portable personal computer 101 can directly access the RAM 163 of the desktop personal computer 111 and the CPU 161 of the desktop personal computer 111 can directly access the RAM 143 and the EEPROM 149 of the portable personal computer 101. An example of each of the various operations in this case is described in the following with reference to flowcharts.

Figure 26:
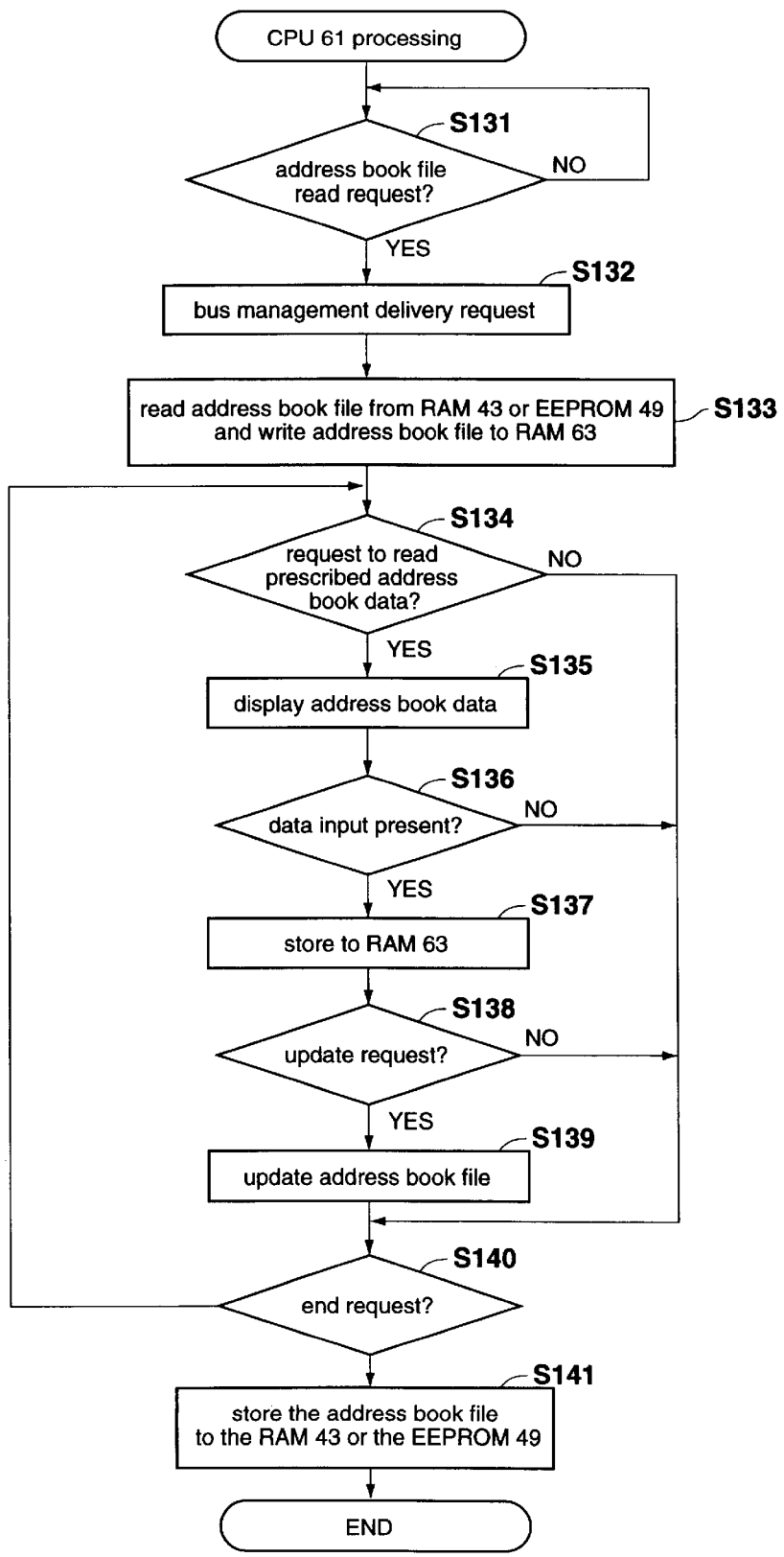
FIG. 26 is a flowchart illustrating the operation of the desktop personal computer when processing address book files of the second embodiment of the present invention.

FIG. 26 is a flowchart of the process for reading, newly inputting and revising address book files stored in the RAM 143 (or EEPROM 149) of the portable personal computer 101 at the desktop personal computer 111.

First, in step S131, the CPU 161 of the desktop personal computer 111 makes a determination as to whether or not an instruction to read an address book file has been inputted via the keyboard 114 (address book key operation) or the mouse 116. When it is determined that a read instruction has been inputted, step S132 is proceeded to and the CPU 161 makes a request for bus management hand-over to the CPU 141 of the portable personal computer 101. When this request is received by the CPU 141, the CPU 141 hands over management authority of the bus within the portable personal computer 101 to the CPU 161.

In step S133, the CPU 161 that bus management authority has been handed over to directly accesses the RAM 143 and the EEPROM 149 already listed as management devices and reads the address book file. The CPU 161 then temporarily stores the read-out address book file in a buffer region of the RAM 163 and outputs address book file display data to the display 112 for displaying. The above operation is not executed when it is determined in step S131 that an instruction to read the address book file has not been given.

Step S134 is proceeded to and the CPU 161 makes a determination as to whether or not an instruction to read prescribed data has been inputted via the keyboard 114 or the mouse 116. When it is determined that an instruction to read has been inputted, step S135 is proceeded to, the CPU 161 reads the requested address book data from the RAM 163, and this data is outputted to the display 112 and displayed.

Next, in step S136, the CPU 161 determines whether or not a write instruction has been inputted via the keyboard 114 or the mouse 116. When a write instruction has been inputted, step S137 is proceeded to. The CPU 161 then temporarily stores new address and revised address data inputted as a result of the user operating the keyboard 114 in a buffer region of the RAM 163 and step S138 is proceeded to. In step S138, the CPU 161 determines whether or not an instruction to write to (update) the address book has come from the keyboard 114 or the mouse 116. When an update instruction has been inputted, the CPU 161 then updates the address book file in step S139 based on data stored in the buffer region of the RAM 63.

Step 140 is then proceeded to and the CPU 161 makes a determination as to whether or not an instruction to end the address book processing has been inputted via the keyboard 114 or the mouse 116. When an instruction to end the address book processing is inputted, step S141 is proceeded to. The CPU 161 then executes a process to transfer the address book file stored in RAM 163 to the RAM 143 or EEPROM 149 of the portable personal computer 101. Namely, in order to execute this transfer process, the CPU 161 asks the DMA controller 164 for hand-over of bus management authority. When bus management hand over authority is received, the DMA controller 164 DMA transfers address book files stored in the buffer region of the RAM 163 to buffer regions of the RAM 143 and the EEPROM 149 (listed as a management device of the CPU 161 in step S101 of FIG. 24) via the connector 115 of the desktop personal computer 111 and the connector 104 of the portable personal computer 101. If these files have been transferred to the RAM 143, these address book files are transferred from the buffer region of the RAM 143 to the address book region of the EEPROM 149 as necessary for recording in the EEPROM 149.

Further, the process in step S135 to step S139 is skipped when there is no instruction for reading prescribed address book data inputted in step S134. Moreover, when no write instruction is inputted in step S136, the process from step S137 to step S139 is skipped. When no update instruction is inputted in step S138, the process in step S139 is skipped.

When processing of the address book does not end in step S140, step S131 is returned to and the process thereafter is repeated.

Next, the operation when an electronic mail function (transmission and receival) is executed with the personal computers together as one is described.

Figure 27:
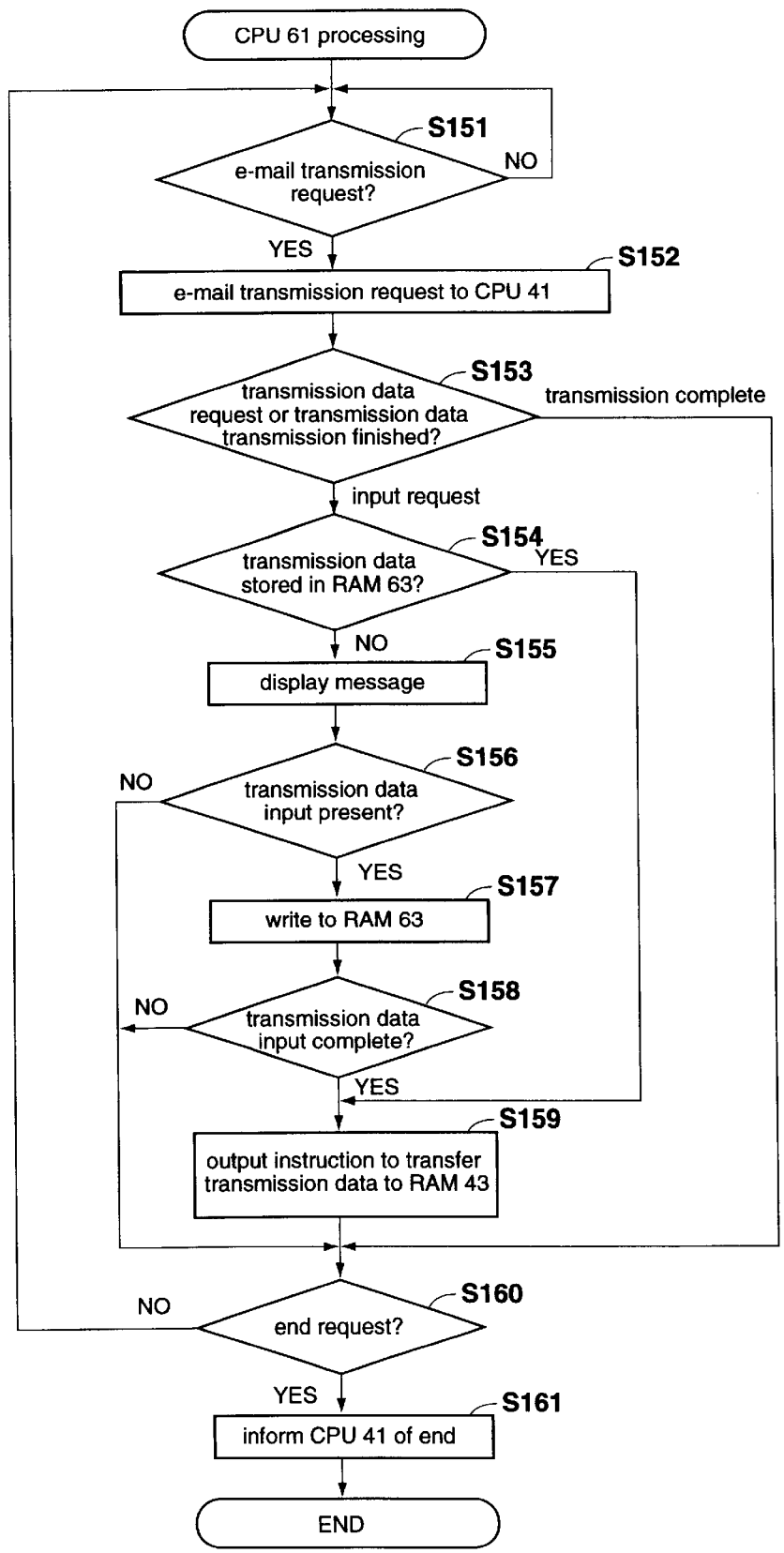
FIG. 27 is a flowchart illustrating the operation of the desktop personal computer when sending electronic mail in the second embodiment of the present invention.

The portable personal computer 101 has an electronic mail function (for wireless communications or wired communications). The CPU 161 of the desktop personal computer 111 then executes the process shown in the flowchart in FIG. 27 and the CPU 141 of the portable personal computer 101 executes the process in the flowchart shown in FIG. 28 when transmission data generated by the portable personal computer 101 or the desktop personal computer 111 is transmitted using the electronic mail function of the portable personal computer 101. The portable personal computer 101 and the desktop personal computer 111 have communications functions consisting of a function (word processor function) for making data to be sent as electric mail or as faxes and a function for sending and receiving the electric mail itself. However, in the example described below, a description is given of the particular case where transmission data for electric mail generated at the desktop personal computer 111 is transmitted by the wireless communication function of the portable personal computer 101.

First, a description is given of the operation of the electronic mail transmission process. The CPU 161 of the desktop personal computer 111 makes a determination in step S151 of the flowchart of FIG. 27 as to whether or not an instruction to process transmission of electronic mail has been inputted from the keyboard (operation of transmission key) 114 or the mouse 116. If the CPU 161 determines that an instruction to process the transmission of electronic mail has been inputted, step S152 is proceeded to and a request is made to the CPU 141 of the portable personal computer 101 to execute electronic mail transmission. If an electronic mail transmission process is not requested in step S151, the following operation is not executed.

Figure 28:
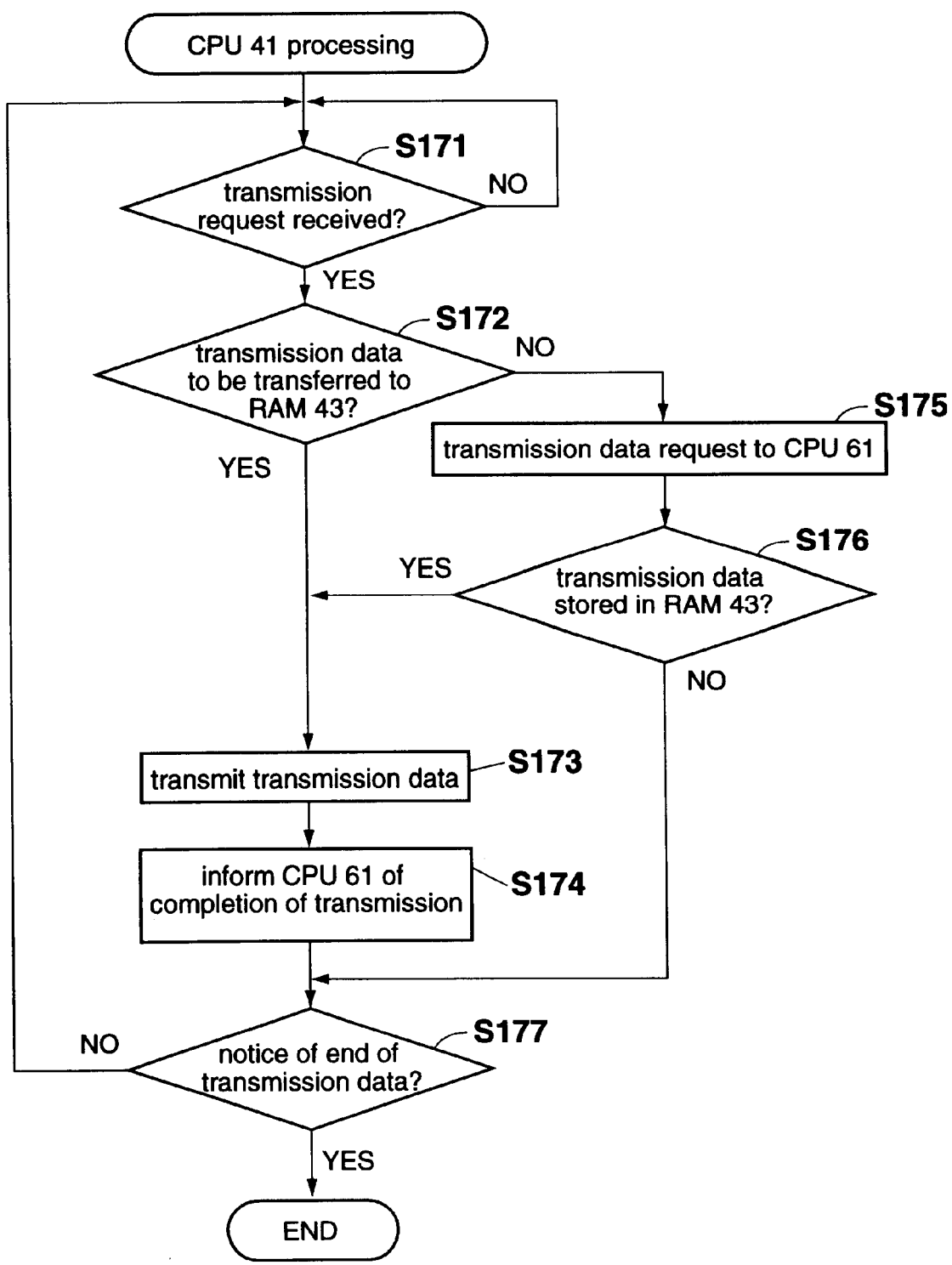
FIG. 28 is a flowchart illustrating the operation of the portable personal computer when sending electronic mail in the second embodiment of the present invention.

The CPU 141 of the portable personal computer 101 executes the process shown in the flowchart of FIG. 28 in response to this request. First, the CPU 141 determines whether or not a request to transmit electronic mail is supplied from the CPU 161. When a request to transmit electronic mail has been received, step S172 is proceeded to and the CPU 141 determines whether or not transmission data is stored in the buffer region of the RAM 143. When the transmission data has all been inputted due to operations of the keyboard 103 of the portable personal computer 101 so as to be all stored in the buffer region of the RAM 143, step S173 is proceeded to. The CPU 141 then reads this transmission data from the buffer region of the RAM 143 and this transmission data is supplied to the wireless communicator 147 to be modulated within this wireless communicator 147. The wireless communicator 147 changes this data into waves to be transmitted via an antenna 148. The transmitted waves are then received at the nearest base station 121-$i$ and then transmitted to a prescribed destination via further base stations 121-$i$ or the network 122. Step S174 is proceeded to and the CPU 141 notifies CPU 161 of completion of transmission of the transmission data. When it is determined in step S171 that an electronic mail transmission process has not been requested, the following operation is not executed.

When it is determined in step S172 that transmission data is not stored in the buffer region of the RAM 143, step S175 is proceeded to and the CPU 141 requests input of transmission data to the CPU 161.

The CPU 161 of the desktop personal computer 111 determines whether or not notification of data transmission completion or a request for transmission data input has been inputted from the CPU 141. When notification of data transmission completion has been inputted, the CPU 161 skips step 154 to step 159. On the other hand, when a transmission data input request has not been inputted, the CPU 161 proceeds to step S154 and a determination is made as to whether or not transmission data is stored in the buffer region of the RAM 163. When transmission data is stored, the CPU 161 skips step S155 to step S158 and a process for transferring transmission data for electronic mail stored in the buffer region of the RAM 163 to the RAM 143 of the portable personal computer 101 is executed in step S159. The details of the operation of the transfer process are described below.

Further, when the transmission data is not stored, step S156 is proceeded to and the CPU 161 generates a message suggesting the inputting of transmission data for displaying on the display 112. The display 112 then displays a message to the effect of, for example, "please input transmission data". At this time, the CPU 141 communicates with the CPU 161 and causes the same message to be displayed at the LCD 102 as necessary.

When the user sees this message, the user operates the keyboard 114 to input the transmission data. In step S156, the CPU 161 determines whether or not transmission data has been inputted via the keyboard 114 or the mouse 116. When transmission data has been inputted, step S157 is proceeded to, the inputted transmission data is temporarily stored in the buffer region of the RAM 163 and step S158 is proceeded to.

Next, a determination is made by the CPU 161 in step S158 as to whether or not a transmission data input completion instruction has been inputted from the keyboard 114 or the mouse 116. When a transmission data input completion instruction has been inputted, step S159 is proceeded to. The CPU 161 then executes processing to transfer the transmission data for the electronic mail stored in the buffer region of RAM 163 to the RAM 143 of the portable personal computer 101. Namely, the CPU 161 asks the DMA controller 164 for hand over of bus management authority. When this request is received, the DMA controller 164 receives bus management hand over authority and the transmission data for the electronic mail stored in the RAM 163 is DMA transferred to the RAM 143.

When an instruction to input transmission data is not inputted in step S156, the process of steps S157 to S159 is skipped. Further, when an instruction of completion of transmission data is not inputted in step S158, the process of step S159 is skipped.

On the other hand, in step S176, the CPU 141 of the portable personal computer 101 makes a determination as to whether or not transmission data has been stored in the buffer region of the RAM 143 by the DMA controller 164. When this transmission data is stored in the buffer region of the RAM 143, step S173 is proceeded to and the transmission data is transmitted in the same way as above. Alternatively, when transmission data is not stored in the RAM 143 in step S176, the process of step S173 and step S174 is skipped.

Moreover, the CPU 161 of the desktop personal computer 111 makes a determination as to whether or not notification of completion of the transmission process for the electric mail has been inputted in step S160 from the keyboard 114 or the mouse 116. When notification of completion of the transmission process for the electronic mail is inputted, the CPU 161 proceeds to step S161, notification of completion of the transmission process for the electronic mail is given to the CPU 141 and the electronic mail transmission process is complete. On the other hand, when the electronic mail transmission process is not complete in step S160, step S151 is returned to and the process thereafter is repeated.

Further, when the CPU 141 of the portable personal computer 101 makes a determination as to whether or not notification of completion of the electronic mail transmission process has been inputted from the CPU 161 in step S177, the CPU 141 ends the electronic mail transmission process. On the other hand, when notification of the end of the transmission process for the electronic mail is not inputted, the CPU 141 returns to step S171 and the process thereafter is repeated.

Figure 29:
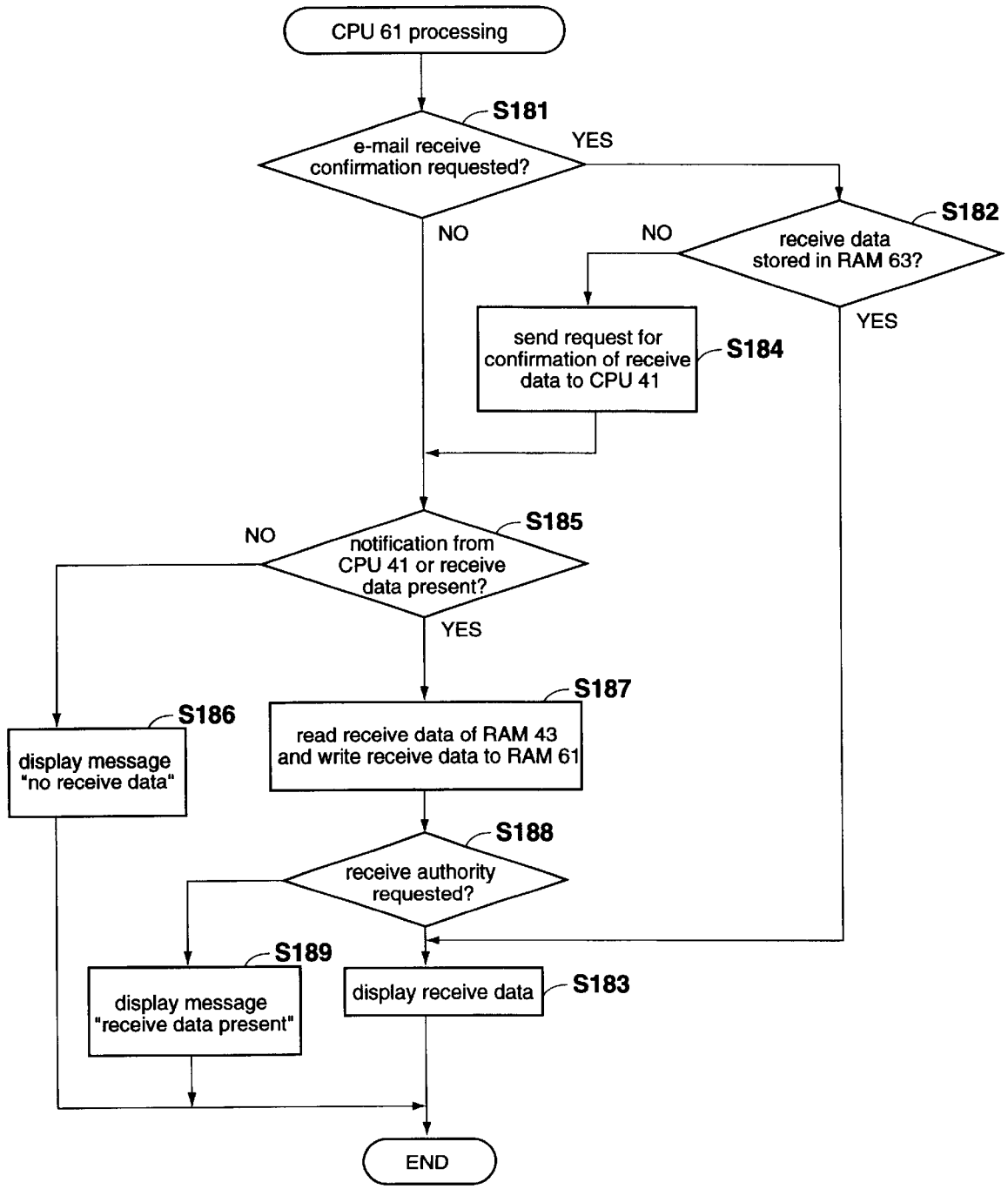
FIG. 29 is a flowchart illustrating the operation of the desktop personal computer when receiving electronic mail in the second embodiment of the present invention.
Figure 30:
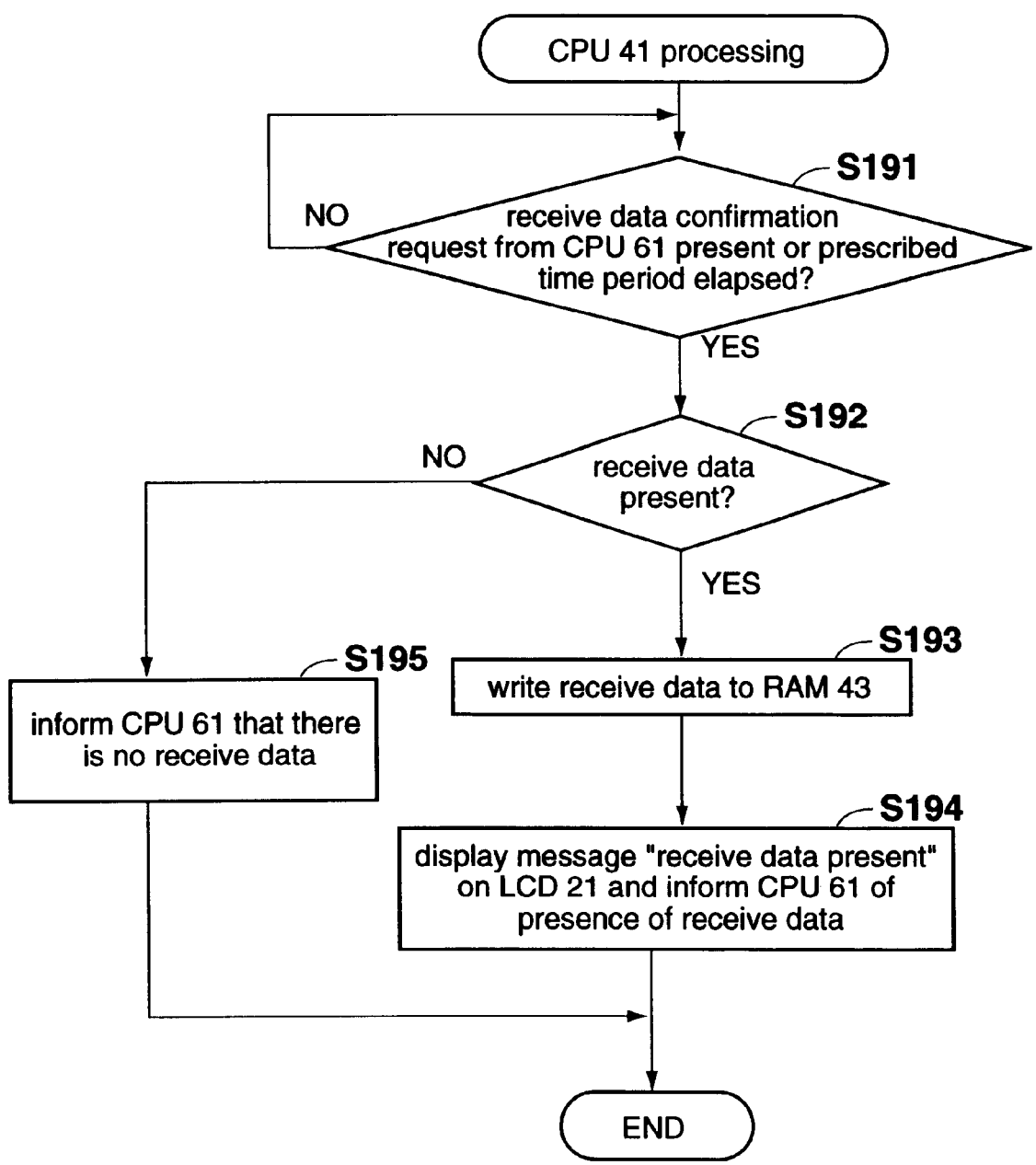
FIG. 30 is a flowchart illustrating the operation of the portable personal computer when receiving electronic mail in the second embodiment of the present invention.

Next, a description is given of the process for receiving electronic mail. When an electronic mail function is executed to receive electronic mail data from the network 122 or the base station 121-$i$, the CPU 161 of the desktop personal computer 111 executes the process shown in FIG. 29 and the CPU 141 of the portable personal computer 101 executes the process shown in the flowchart of FIG. 30.

First, the CPU 161 of the desktop personal computer 111 makes a determination as to whether or not a receive data confirmation of display instruction has been inputted from the keyboard 114 (operation of the data receive key) or the mouse 116 in step S181. When receive data confirmation or a display instruction is inputted, the CPU 161 proceeds to step S182, and a determination is made as to whether or not receive data is stored in the buffer region of the RAM 163. In step S182, when receive data is stored in the buffer region of RAM 163, step S183 is proceeded to. The CPU 161 then reads this receive data from the buffer region of the RAM 163 and supplies this data to the display 112 for displaying, with the display operation for the receive data confirmation then being complete. On the other hand, when receive data is not stored in the buffer region of the RAM 163, step S184 is proceeded to. The CPU 161 then supplies a request for confirmation of whether or not the receive data has been received at the portable personal computer 101 to the CPU 141 of the portable personal computer 101 and step S185 is proceeded to.

In step S181, when receive data confirmation of a display instruction is not inputted, step S185 is proceeded to and the CPU 161 makes a determination in step S185 as to whether or not notification (notification as to whether or not receive data is written in the buffer region of the RAM 143) has been inputted from the CPU 141 of the portable personal computer 101. When notification is not inputted from the CPU 141 or the notification from the CPU 141 is notification that there is no receive data, step S186 is proceeded to and the CPU 161 displays a message of, for example, "no receive data present" on the display 112. At this time, the CPU 141 causes the same message to be displayed on the LCD 102 and this operation is complete.

On the other hand, when notification is inputted from the CPU 141 and this notification is notification that receive data is present, step S187 is proceeded to. The CPU 161 then reads the receive data from the buffer region of the RAM 143 and stores this receive data in the buffer region of the RAM 163.

Step S188 is then proceeded to and the CPU 161 makes a determination as to whether or not receive data confirmation or a display instruction has been inputted from the keyboard 114 or the mouse 116. When receive data confirmation or a display instruction is inputted, step S183 is proceeded to, the CPU 161 reads out receive data from the buffer region of the RAM 163 and this receive data is supplied to the display 112 and displayed. On the other hand, when receive data confirmation or a display instruction is not inputted from the keyboard 114 or the mouse 116 in step S188, step S189 is proceeded to and a message displaying the presence of receive data is displayed on the display 112, with this operation then being complete. In the above, the operation of this kind of CPU 161 is executed when there is a request from the keyboard 114 or the mouse 116.

Further, in step S191, the CPU 141 of the portable personal computer 101 determines whether or not an instruction for confirmation of receive data has been inputted and determines whether or not a prescribed period of time has elapsed. When a receive data confirmation request is inputted or a set prescribed period of time has elapsed, the CPU 141 proceeds to step S192 and a determination is made as to whether or not electronic mail data from the network 122 or the base station 121-$i$ exists. When receive data exists, the CPU 141 proceeds to step S193 and a process is executed so as to store the receive data in the buffer region of the RAM 143. Namely, the wireless communicator 147 detects data sent from the base station 121-$i$ via the antenna 148 and the detected data is modulated. The demodulated receive data is then stored in the buffer region of the RAM 143 and step S194 is proceeded to. Further, the modem 146 receives data sent from the network 122 and modulates this received data. The modulated received data is then stored in the buffer region of the RAM 143 and step S194 is proceeded to. When it is determined that a receive data confirmation request is not inputted in step S191 and the prescribed time period has not elapsed, the following operation is not executed.

Next, in step S193, the CPU 141 displays the writing of receive data to the buffer region of the RAM 143 on the LCD 102 (the receive data only when a prescribed period of time is determined to have elapsed) and informs the CPU 161 of the desktop personal computer 111 that receive data is stored in the buffer region of the RAM 143, with this operation then being complete. Further, when it is determined that the electronic mail data does not exist in step S192, CPU 141 notifies the CPU 161 that there is no receive data in step S195 and this operation is complete. The receive data stored in the buffer region of the RAM 163 can also be recorded on a hard disc. In the above, the operation of the CPU 141 is executed every time there is a confirmation instruction from the CPU 161 or every time a prescribed period of time passes.

In this way, the CPU 161 of the desktop personal computer 111 can directly access the RAM 143 of the portable personal computer 101 and write data but the CPU 141 of the portable personal computer 101 cannot directly access the RAM 163 of the desktop personal computer 111 and read and write data.

Further, the CPU 141 of the portable personal computer 101 can be connected to a network or base station in a hard-wired or wireless manner via the wireless communicator 147 or a modem 146 and be connected to a third party personal computer connected to a network or base station. This means that a third party user can then access the portable personal computer 101 via the network.

Therefore, because the portable personal computer 101 can directly access the desktop personal computer 111, there is a high possibility that the third party user could take out data stored in the RAM 163 of the desktop personal computer 11 via the portable personal computer 101. In order to prevent this, the second embodiment is configured so that the CPU 161 is allowed to directly access the RAM 43 but the CPU 141 is not allowed to directly access the RAM 163.

The user therefore stores important information in the RAM 163 or the hard disc 167 of the desktop personal computer 111 and stores information that is not particularly secret in the RAM 143 or EEPROM 149 of the portable personal computer 101 so that important information cannot be taken out by the third party.

According to the information processing system and the information processing method of the second embodiment of the present invention, storage parts of a device having a communications function can be directly accessed from a device not having a communications function and information can be written and read but the device having the communications function cannot access the memory parts of the device not having a communications function. Information management is therefore simplified, operativity is improved and secrecy is heightened.

Various modifications and practical examples can also be considered for the present invention, without deviating from the scope of the essence of the present invention. The essence of the present invention is therefore by no means limited to the above embodiments.

What is claimed is:

1. An information processing system, comprising:
   a first information processing device and a second information processing device connected to said first information processing device,
   wherein said first information processing device comprises:
      a first connection device connected to said first information processing device;
      a first memory for storing information; and a first processor for processing information, and
   wherein said second information processing device comprises:
      a second connection device connected to said first connection device via a transmission bus;

a second memory for storing information; and
a second processor for processing information,
said first processor directly accessing said second memory of said second information processing device to read and write information;
wherein, when said first processor requests a transmission bus management authority from said second processor, said second processor hands over said management authority to said first processor such that said first and second information processing devices are configured to operate as a single information processing system;
wherein when said second processor hands over said management authority to said first processor, said first processor is configured to update the information stored in said second memory to correspond to the information stored in said first memory; and further
wherein said second processor is capable of reading information stored in said first memory but prohibited from writing to said first memory of said first information processing device.

2. The system of claim 1, wherein
said first processor is configured to list said second memory of said second information processing device as a management device of said first processor when said first connection device and said second connection device are connected, and
said second processor is configured to list said first memory of said first information processing device as a management device of said second processor.

3. The system of claim 2, wherein said second information processing device is a portable information processing device.

4. A portable information processing device connected to a prescribed information processing device, wherein
said prescribed information processing device comprising
a first memory,
a first processor, and
a first connection device, and
said portable information processing device comprising:
a second connection device connected to said first connection device of said prescribed information processing device by a transmission bus;
a second memory for storing information; and
a second processor for processing information,
said second processor configured to directly access said first memory of said prescribed information processing device to read information from said first memory;
wherein, when said second processor requests a transmission bus management authority from said first processor, said first processor hands over said management authority to said second processor such that said portable information processing device and said prescribed information processing device are configured to operate as a single information processing system;
wherein when said first processor hands over said management authority to said second processor, said second processor is configured to update the information stored in said first memory to correspond to the information stored in said second memory; and further
wherein said second processor is capable of reading information stored in said first memory but prohibited from writing to said first memory of said prescribed information processing device.

5. The system of claim 4, wherein said second memory is configured to permit access by said first processor to read and write information.

6. The system of claim 4, wherein said second processor is configured to list said first memory of said information processing device as a management device of said second processor when said first connection device and said second connection device are connected.

7. An information processing device connected to a portable information processing device,
wherein said portable information processing device comprises:
a memory;
a processor; and
a connection device, and
said information processing device comprises:
a connection device connected to said connection device of said portable information processing device via a transmission bus;
a memory for storing information; and
a processor for processing information,
said processor of said information processing device directly connecting to said memory of said portable information processing device to read and write information thereto;
wherein, when said processor of said information processing device requests a transmission bus management authority from said processor of said portable information processing device, said processor of said portable information processing device hands over said management authority to said processor of said information processing device such that said portable information processing device and said information processing device are configured to operate as a single information processing unit;
wherein when said processor of said portable information processing device hands over said management authority to said processor of said information processing device, said processor of said information processing device is configured to update the information stored in said memory of said portable information processing device to correspond to the information stored in said memory of said information processing device; and further
wherein said second processor is capable of reading information stored in said first memory but prohibited from writing to said first memory of said information processing device.

8. The system of claim 7, wherein said memory of said information processing device is configured to permit direct access by processor of said portable information processing device to write and read information.

9. The system of claim 7, wherein said processor of said information processing device is configured to list said memory of said portable information processing device as a management device of said processor of said information processing device when said connection device of said portable information processing device and said connection device of said information processing device are connected.

10. An information processing system comprising a main information processing device and a sub-information processing device connected to said main information processing device,
wherein said main information processing device comprises:
a connection device connected to said sub-information processing device;

a memory for storing information; and
a main processor for processing information, and
wherein said sub-information processing device comprises:
a connection device connected to said connection device of said sub-information processing device via a transmission bus;
a memory for storing information; and
a sub-processor for processing information,
said main processor directly accessing said memory of said sub-information processing device to read and write information,
wherein, when said main processor requests a transmission bus management authority from said sub-processor, said sub-processor hands over said management authority to said main processor such that said main information processing device and said sub-information processing device are configured to operate as a single information processing system;
wherein when said sub-processor hands over said management authority to said main processor, said main processor is configured to update the information stored in said memory of said sub-information processing device to correspond to the information stored in said memory of said main information processing device; and further
wherein said sub-processor is capable of reading information stored in said memory of said main information processing device but prohibited from writing to said memory of said information processing device.

11. The system of claim 10, wherein said main processor is configured to list said memory of said sub-processing device as a management device of said main processor when said connection device of said information processing device and said connection device of said sub-information processing device are connected.

12. The system of claim 11, wherein said sub-information processing device is a portable information processing device.

13. The system of claim 12, wherein said portable information processing device includes a communication device for carrying out communications with a further information processing device connected via a communications system.

14. A portable information processing device connected to a main information processing device,
wherein said main information processing device comprises
a memory,
a main processor and
a connection device, and
wherein said portable information processing device comprises:
a connection device connected to said connection device of said main information processng device via a transmission bus;
a memory for storing information; and
a sub-processor for processing information,
said memory of said sub-information processing device being allowed to be directly accessed by said processor to read information therefrom and write information thereto;
wherein, when said main processor requests a transmission bus management authority from said sub-processor, said sub-processor hands over said management authority to said main processor such that said main information processing device and said portable information processing device are configured to operate as a single information processing unit;
wherein when said sub-processor hands over said management authority to said main processor, said main processor is configured to update the information stored in said memory of said portable information processing device to correspond to the information stored in said memory of said main information processing device; and further
where in said sub-processor is capable of reading information stored in said memory of said main information processing device but prohibited from writing to said memory, of said information processing device.

15. The system of claim 14, wherein said memory of said sub-information processing device is listed as a management device of said processor when said connection device of said main information processing device and said connection device of said sub-information processing device are connected.

16. The system of claim 15, wherein said portable information processing device includes a communications device for communicating with a further information processing device connected via a communications system.

17. An information processing device connected to a portable information processing device,
wherein said portable information processing device comprises:
a memory;
a sub-processor; and
a connection device, and wherein said information processing device comprises:
a connection device connected to said connection device of said portable information processing device via a transmission bus;
a memory for storing information; and
a main processor for processing information,
said main processor directly accessing said memory of said portable information processing device to read and write information thereto;
wherein, when said main processor requests a transmission bus management authority from said sub-processor, said sub-processor hands over said management authority to said main processor such that said information processing device and said portable information processing device are configured to operate as a single information processing unit;
wherein when said sub-processor hands over said management authority to said main processor, said main processor is configured to update the information stored in said memory of said portable information processing device to correspond to the information stored in said memory of said main information processing device; and further
wherein said sub-processor is capable of reading information stored in said memory of said information processing device but prohibited from writing to said memory of said information processing device.

18. The system of claim 17, wherein said main processor of said information processing device lists said memory of said portable information processing device as a management device of said main processor of said information processing device when said connection device of said portable information processing device and said connection device of said information processing device are connected.

* * * * *